(12) United States Patent
Takeda et al.

(10) Patent No.: US 7,645,042 B2
(45) Date of Patent: Jan. 12, 2010

(54) LIGHT CONDUCTING UNIT, ILLUMINATION APPARATUS, AND PROJECTION TYPE DISPLAY APPARATUS

(75) Inventors: Takashi Takeda, Suwa (JP); Akira Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/153,986

(22) Filed: May 28, 2008

(65) Prior Publication Data
US 2008/0239526 A1 Oct. 2, 2008

Related U.S. Application Data

(62) Division of application No. 10/871,004, filed on Jun. 21, 2004, now abandoned.

(30) Foreign Application Priority Data

Jun. 23, 2003 (JP) ............................. 2003-177947
Sep. 25, 2003 (JP) ............................. 2003-333548

(51) Int. Cl.
G03B 21/26 (2006.01)
G03B 21/28 (2006.01)

(52) U.S. Cl. ...................... 353/37; 353/81; 385/901; 362/551

(58) Field of Classification Search ............... 353/37, 353/81, 102; 385/146, 901; 362/551, 560
See application file for complete search history.

(56) References Cited

U.S. PATENT DOCUMENTS

| | | | |
|---|---|---|---|
| 4,580,195 A | 4/1986 | Mori | |
| 5,812,713 A | 9/1998 | Allen et al. | |
| 6,236,797 B1 | 5/2001 | Hotta et al. | |
| 6,540,359 B1 | 4/2003 | Cornelissen et al. | |
| 6,587,269 B2 * | 7/2003 | Li | 359/497 |
| 6,820,994 B2 | 11/2004 | Funamoto et al. | |
| 6,830,342 B2 | 12/2004 | Lee | |
| 6,843,591 B1 | 1/2005 | Peng et al. | |
| 6,916,097 B2 * | 7/2005 | Omoda et al. | 353/31 |
| 6,953,275 B2 | 10/2005 | Ferri et al. | |
| 7,001,022 B2 | 2/2006 | Kim et al. | |
| 7,033,056 B2 | 4/2006 | Anderson et al. | |
| 7,172,290 B2 * | 2/2007 | Li | 353/37 |

(Continued)

FOREIGN PATENT DOCUMENTS

JP   A-08-111107   4/1996

(Continued)

*Primary Examiner*—Christopher Mahoney
(74) *Attorney, Agent, or Firm*—Oliff & Berridge, PLC

(57) ABSTRACT

A light conducting unit is disposed between a light source and a region which is to be illuminated. In addition, a light conducting unit includes a polygonal prism made from a first medium with a first coefficient of refraction, a first light conducting unit which directs light to be incident upon a first surface of the polygonal prism, and a second light conducting unit upon which light emitted from a second surface of the polygonal prism is incident, wherein the polygonal prism includes a reflective device which reflects light which is incident into the polygonal prism from the first surface towards the second surface, and a second medium with a second coefficient of refraction which is less than the first coefficient of refraction is provided at the first surface and the second surface.

10 Claims, 10 Drawing Sheets

U.S. PATENT DOCUMENTS

| | | |
|---|---|---|
| 2002/0140913 A1 | 10/2002 | Yoneyama et al. |
| 2003/0012533 A1 | 1/2003 | Steiner et al. |

FOREIGN PATENT DOCUMENTS

| | | |
|---|---|---|
| JP | A-2000-56266 | 2/2000 |
| JP | A-2000-75407 | 3/2000 |
| JP | A-2001-228541 | 8/2001 |
| JP | A-2001-318325 | 11/2001 |
| JP | A-2002-244208 | 8/2002 |
| JP | A-2002-268008 | 9/2002 |
| JP | A-2004-004793 | 1/2004 |
| WO | WO 02/17000 A2 | 2/2002 |

* cited by examiner

US 7,645,042 B2

LIGHT CONDUCTING UNIT, ILLUMINATION APPARATUS, AND PROJECTION TYPE DISPLAY APPARATUS

This is a Division of application Ser. No. 10/871,004 filed Jun. 21, 2004. The disclosure of the prior application is hereby incorporated by reference herein in its entirety.

BACKGROUND OF THE INVENTION

1. Field of the Invention

The present invention relates to a light conducting unit, an illumination apparatus, and a projection type display apparatus.

Priority is claimed on Japanese Patent Applications Nos. 2003-177947 filed Jun. 23, 2003 and 2003-333548 filed Sep. 25, 2003, the contents of which are incorporated herein by reference.

2. Description of Related Art

As a first background art in the field of display devices, in which the level of needs related to increase in size and increase in resolution is high, a projection type display apparatus such as a liquid crystal projector or a DMD or the like is known as a device which can easily implement such a type of large scale display.

With this type of projection type display apparatus, normally, illumination apparatuses are used in which rod shaped light conducting units are disposed between the light source and the light valves. These illumination apparatuses take advantage of internal surface reflection within the light conducting units, in order to make the intensity of the light which is emitted from the light source uniform over the light valves.

Such a type of illumination apparatus is, for example, disclosed in Japanese Unexamined Patent Application, First Publication No. 2002-268008. The illumination apparatus described in this document includes a light source which emits light, a rod shaped light conducting unit which makes the illumination distribution of the light which has been emitted from the light source uniform, a first lens system which conducts the light which has been emitted from the light conducting unit, a light polarization creation section which emits polarized light which has a predetermined polarization direction, and a second lens for causing the polarized light which has been emitted from this light polarization creation section to be incident upon a predetermined illumination region.

As described above, a rod shaped light conducting unit is employed with such a conventional illumination apparatus, in order to make the illumination distribution of the light which has been emitted from the light source more uniform. With this type of light conducting unit, the more it is desired to enhance the uniformity of the illumination distribution, the longer is it necessary to make the length of the light conducting unit. However, the problem arises that, when the length of the light conducting unit is made longer, the side and particularly the length of the illumination apparatus become excessive.

Furthermore, in order to reduce the dimensions of the illumination apparatus, the light conducting unit is bent and folded as shown in FIG. 5, then the light, as shown by the arrow sign E in FIG. 5, is reflected in the direction of the light source by the bending and folding portion of the light conducting unit, and, as shown by the arrow sign F in FIG. 5, the light is reflected so as to be emitted at a large emission angle from the light conducting unit, so that it comes to be no longer incident upon the desired illumination region. In other words, there is the problem that, when making the illumination distribution of the light more uniform, the losses become great.

As a second background art, as a light source for a liquid crystal projector, as for example shown in Japanese Unexamined Patent Application, First Publication No. 2000-56266, there exists a device which performs light polarization conversion at high efficiency by, after dividing the light from a lamp into a P polarized light beam and a S polarized light beam, directing these light beams to be incident into one end of a rod integrator, and by converting only the S polarized light in the light which is emitted from the other end of the rod integrator into P polarized light by a phase difference plate which has a spatial distribution and which is disposed at the other end of the rod integrator.

Furthermore, as another type of light source, as for example disclosed in Japanese Unexamined Patent Application, First Publication No. 2000-75407, there exists a device which, along with causing light beams from a pair of lamps to be respectively incident upon a pair of incidence surfaces which are provided to a prism whose vertex angle is approximately 60° and which is formed at an end portion of a rod integrator, also conducts the light into the rod integrator by totally internally reflecting these light beams off the inner side of the opposite incident surfaces.

However, with the above described type of light source, it is not easy to obtain the length of any of the rod integrators. In other words, taking the incident end of the rod integrator as a standard, since the lamps are now disposed in directions which subtend obtuse angles greater than a predetermined angle with respect to the axial direction of the rod integrator, accordingly it is not possible to ensure that the dimensions of the light source with respect to the axial direction of the rod integrator do not become excessively great, so that making the dimensions of the rod integrators long becomes no longer easy. As a result, either the degree by which the rod integrator makes the illumination light more uniform drops below the predetermined desired level, or it is not possible to prevent the overall dimensions of the light source from becoming great, so that the degree of freedom in the design is reduced.

Furthermore, with the above described type of light source, the spatial light modulation element (which is the object of illumination) is arranged in the frontal direction of the emission end of the rod integrator, accordingly, for the same reasons as described above, ether the dimensions of the light source or the dimensions of the projector with respect to the axial direction of the rod integrator become great, so that it becomes no longer easy to lengthen the dimensions of the rod integrator.

The present invention has been conceived in the light of the above described problems, and it takes as its first objective to provide a light conducting unit, and an illumination apparatus and a projection type display apparatus therewith, with which there is no loss of the incident light even though it is bent and folded around, and which can make the illumination distribution of this light more uniform; and the present invention also takes, as its second objective, to provide an illumination apparatus, and a projection type display apparatus which incorporates it, with which, while achieving a sufficiently good uniformization of the illumination light by the rod integrator, also the freedom of design is increased by making the dimensions of the light source more compact, and the like.

SUMMARY OF THE INVENTION

In order to attain the above described objectives, the first aspect of the present invention is a light conducting unit disposed between a light source and a region which is to be illuminated, having a polygonal prism made from a first medium with a first coefficient of refraction, a first light conducting unit which directs light to be incident upon a first surface of the polygonal prism, and a second light conducting unit upon which light emitted from a second surface of the polygonal prism is incident, wherein the polygonal prism comprises a reflective device which reflects light which is incident into the polygonal prism from the first surface towards the second surface, and a second medium with a second coefficient of refraction which is less than the first coefficient of refraction is provided at the first surface and the second surface.

In other words, with the first aspect of the present invention, the light which is incident upon the first light conducting unit is incident upon the first surface of the polygonal prism. A portion of this light which is incident upon the polygonal prism is directly propagated towards the second surface, but, when it is incident upon the second surface at an angle of incidence which is large, due to the difference between the first and the second coefficient of refraction, it is totally internally reflected at the second surface towards the reflective device. The remainder of the light is propagated from the first surface towards the reflective device.

Furthermore, a portion of the light which has been reflected at the reflective device is propagated towards the first surface, but, due to the fact that it is being propagated from the first medium whose coefficient of refraction is high towards the second medium whose coefficient of refraction is low, and moreover because it is incident at an angle of incidence which is greater than the critical angle which may be determined from the coefficients of refraction of the first medium and of the second medium, it is totally internally reflected at the first surface towards the second surface. The remainder of the light is reflected from the reflective device towards the second surface. The light which is emitted from the second surface is incident upon the second light conducting unit. When the light which has been emitted from the light source is propagated through the first light conducting unit, the polygonal prism, and the second light conducting unit, its illumination distribution is made to be more uniform, and then it is emitted from the second light conducting unit.

In other words, by folding the light conducting unit, its length may be made to be longer, and, along with it becoming possible to obtain light whose illumination distribution has been made more uniform, the degree of freedom in positioning the light conducting unit is also enhanced, and it becomes possible to dispose the light conducting unit in a more restricted space.

Furthermore, as compared to a light conducting unit which is simply bent and folded, it is possible to reduce or to eliminate the occurrence of light which cannot be taken advantage of for illumination because its emission direction is at too great an angle, or light which cannot be taken advantage of because it is reflected back in its direction of incidence by the bent and folded portion. As a result, it is possible to reduce the losses of the light which is incident upon this light conducting unit.

In order to implement the above described structure, in more concrete terms, it is desirable for the above described polygonal prism to be a triangular prism.

According to such a structure, the triangular prism includes the first surface upon which the necessary minimum limit amount of light is incident, the surface upon which the reflective device is provided, and the second surface where the light is emitted. Due to this, useless space is no longer provided, so that it is possible to reduce the size of the light conducting unit, which is most desirable.

Furthermore, since no surfaces are provided which are not utilized, accordingly there is no leakage of light from such surfaces, and thus the efficiency of utilization of the incident light is not deteriorated.

In order to implement the above described structure, in more concrete terms, it will also be acceptable, the first light conducting unit and the second light conducting unit are made in a tubular shape from at least one reflective body with a light reflective surface facing inwards, interiors of the first light conducting unit and the second light conducting unit are filled with the second medium, and surfaces of the first light conducting unit and the second light conducting unit which are not provided with the reflective body constitute an incidence surface and an emission surface.

According to this structure, the light which is incident upon the first light conducting unit and upon the second light conducting unit is reflected by the reflective body, so that its illumination distribution is made more uniform. Since all of the light which is incident is reflected by the reflective body, there is no leakage of the light during such reflection. Due to this, it is possible to suppress losses of the light which is incident within the first light conducting unit and the second light conducting unit.

In order to implement the above described structure, in more concrete terms, the first light conducting unit and the second light conducting unit are made in the shape of posts from a third medium with a third coefficient of refraction, the third coefficient of refraction is greater than the coefficient of refraction of the medium which surrounds the first light conducting unit and the second light conducting unit, and the second medium is disposed between the first light conducting unit and the first surface, and between the second light conducting unit and the second surface.

According to such a structure, since the light which cannot be taken advantage of for illumination because it has a large angle with respect to the longitudinal axial direction of the above described first and second light conducting units has a small angle of incidence at the boundary surface which is parallel to the longitudinal axial direction, accordingly it passes through without being totally internally reflected. The remainder of the light is propagated from the third medium whose coefficient of refraction is large towards the surrounding medium whose coefficient of refraction is small, and moreover is totally internally reflected, since it is incident at an angle of incidence which is larger than the critical angle, which may be determined from the coefficients of refraction of the third medium and of the surrounding medium.

Due to this, the proportion, in the light which is emitted from the second light conducting unit, of the light which cannot be taken advantage of for illumination becomes small. In other words, it is possible to enhance the efficiency of utilization of the light which is emitted from the second light conducting unit.

In order to implement the above described structure, in more concrete terms, gaps between the first light conducting unit and the first surface, and between the second light conducting unit and the second surface, are greater than the product of the wavelength of the light which is being propagated through the first and second light conducting units, and the second coefficient of refraction.

According to such a structure, the gaps between the first light conducting unit and the first surface, and between the second light conducting unit and the second surface, are formed so as to be greater than the product of the wavelength of the light which is being propagated through the first and second light conducting units, and the second coefficient of refraction. Due to this, the width of the above described gaps is formed to be greater than the permeation depth of the Evanescent waves, so that it is possible to prevent the light which is incident under the conditions of total internal reflection from passing over these gaps. In other words, it is possible to enhance the efficiency of utilization of the incident light.

Furthermore, it is desirable for the above described gaps to be narrower than 0.1 mm, in order to reduce the proportion of the light which leaks out to the outside of the light conducting units from the above described gaps, and the proportion of the light which cannot be taken advantage of for illumination of the above described region to be illuminated because it is incident from the first emission surface via the above described gaps upon the second incidence surface at a large angle of incidence.

In order to implement the above described structure, in more concrete terms, a first convex portion is provided at approximately a central portion of a surface of the first light conducting unit which opposes the first surface, a second convex portion is provided at approximately a central portion of a surface of the second light conducting unit which opposes the second surface, and the first convex portion and the first surface are in mutual contact, and the second convex portion and the second surface are in mutual contact.

According to such a structure, since the convex portion of the first light conducting unit and the first surface, and the convex portion of the second light conducting unit and the second surface, are in mutual contact, accordingly gaps are formed between the portions of the first light conducting unit which surround its above described convex portion and the first surface, and between the portions of the second light conducting unit which surround its above described convex portion and the second surface. Since the portions where the light is totally internally reflected by the first surface and by the second surface are these surrounding edge portions, accordingly the portions where the gaps are required are these surrounding edge portions, and no problem will arise of deficiency of total internal reflection, even though no gaps are formed at these approximate central portions. In other words, it is possible to prevent deterioration of the efficiency of utilization of the light which is incident.

Furthermore, since it is possible to adjust the above described gaps by adjusting the height of the convex portions, accordingly it becomes easy to manufacture the light conducting units, since it becomes easy to adjust the above described gaps in this manner.

In order to implement the above described structure, it is desirable to provide a reflection prevention device which suppresses the reflection of light is provided upon at least one of the first surface, the second surface, and the incidence surfaces and the emission surfaces of the first light conducting unit and of the second light conducting unit. More desirable, it is desirable to utilize a reflection prevention layer for this reflection prevention device.

According to such a structure, it is possible to enhance the efficiency of utilization of the light which is incident, since the reflection of the light is reduced at least at one of the first surface, the second surface, the incidence surfaces of the first light conducting unit and of the second light conducting unit, and their emission surfaces. It should be understood that since, even if such a reflection prevention device is provided, the light which is incident at angles which are greater than the critical angle for total internal reflection will be totally internally reflected by the above described light transparent surface, accordingly no loss of the efficiency of utilization of the light which is incident occurs.

Furthermore, by utilizing a reflection prevention layer as the reflection prevention device, it is possible to reduce the space which is occupied by the reflection prevention device, and accordingly it is possible to arrange the light conducting unit in a tighter space than was previously possible.

The second aspect of the present invention, an illumination apparatus having a light source, and the above described light conducting unit, located between the light source and a region which is to be illuminated.

By utilizing a light conduction unit according to the present invention as the light conduction unit for an illumination apparatus, along with it being possible to enhance the uniformity of the distribution of illumination of the picture elements which are projected, also this is compatible with anticipation of a reduction in the overall size of the projection type display apparatus.

The third aspect of the present invention is a projection type display apparatus having the above described illumination apparatus, a light modulation device which modulates the light which has been emitted from the illumination apparatus, and a projection device which projects the light which has been modulated by the light modulation device.

By utilizing an illumination apparatus according to the present invention as the illumination apparatus for a projection type display apparatus, along with it being possible to enhance the uniformity of the distribution of illumination of the picture elements which are projected, also this is compatible with anticipation of a reduction in the overall size of the projection type display apparatus.

The fourth aspect of the present invention is an illumination apparatus having (a) a light source which emits light for illumination, (b) a light concentration device which concentrates light from the light source to a predetermined angular range, and (c) a light uniformization device formed from a transparent material in the shape of a post, and which has, at least at one of its ends, an inclined end surface which defines an angle of inclination of approximately 45° with respect to the axis of the post shape, wherein the light uniformization device totally internally reflects the light from the inclined end surface, when the light passes through the light concentration device and along the post shape.

According to this aspect, since the light uniformization device which is formed in a post shape from a material which is transparent to light totally internally reflects the light from the light source which has passed along this post shape from the inclined end surface which defines an angle of approximately 45° with respect to this side surface of the post shape, accordingly it is possible to conduct the light from the light source at the stage that it is incident upon the light uniformization device, or the light from the light source at the stage that it is emitted from the light uniformization device, in the direction which is approximately perpendicular to the axial direction of the post shape, without utilizing any reflective layer which is formed by coating. Accordingly it is possible, not only easily to suppress increase of the dimension of the light source which includes this light uniformization means and this light source with regard to the axial direction of the post shape, but also to make the light from the light source which has passed through the light uniformization means sufficiently uniform. At this time, the post shape which is made from a light transparent material functions as a rod integrator for performing wave front splitting and superposition of the light from the light source, and, furthermore, since it is possible to totally internally reflect the light from the light source at the side surfaces of the post shape in the vicinity of the inclined end surface before or after it is incident upon the inclined end surface, accordingly it is possible to increase the action for making the light from the light source more uniform by a further stage, since the length of the rod integrator has effectively been increased in practice.

Furthermore, with this aspect, the post shaped transparent light uniformization device may be formed in a post shape which has a first pair of side surfaces which are mutually parallel, and a second pair of side surfaces which are mutually parallel and are also orthogonal to the first pair of side surfaces, and the inclined end surface is orthogonal to the first pair of side surfaces and defines an angle of approximately 45° with respect to the second pair of side surfaces. In this case, it is possible to implement illumination of a object which is to be illuminated which has a rectangular shape, such as a display screen or the like, simply and easily.

Yet further, with this aspect, the post shaped transparent light uniformization device, at least at one end of its four cornered post shaped rod integrator main body, is formed as a right angled prism portion with the inclined end surface being its side surface corresponding to the hypotenuse.

Even further, with this aspect, the post shaped transparent light uniformization device may desirably be formed from a glass material with a coefficient of refraction such as to implement total internal reflection at the inclined end surface for the predetermined angular range and the angle of inclination. In this case, it becomes possible to illuminate the liquid crystal light valve or the like by reflection of the light source light from the inclined end surface efficiently, without any losses.

Moreover, with this aspect, the light concentration device may conduct the light from the light source into the light uniformization device via a transparent window surface portion upon a one of the second pair of side surfaces which is opposed to the inclined end surface. In this case, the transparent window surface portion which is opposed to the inclined end surface constitutes the incident port for the light from the light source, and the light from the light source which is incident here is made more uniform by wave front splitting and superimposition being performed while it is efficiently shut in within the post shape made of transparent material, so that it may be emitted from the other end of the four cornered post shape.

Still further, with this aspect, the light concentration device may cause at least a major portion of the light from the light source to be incident via the transparent window surface portion upon the inclined end surface either directly or indirectly. In this case, it is possible to make the light from the light source be incident upon the inclined end surface without any loss, so that it becomes possible to illuminate the liquid crystal light valve or the like efficiently.

Furthermore, according to the concrete aspect of the present invention, the light uniformization device is reflected the light which has passed along the post shape from the inclined end surface, and emits the light to the outside via a transparent window surface portion upon one of the second pair of side surfaces which is opposed to the inclined end surface. In this case, the transparent window surface portion which opposes the inclined end surface becomes the emission port for the light from the light source, so that it is possible to make the light from the light source which has passed along the post shape which is made from a transparent material and which is emitted from the emission port more uniform in an efficient manner.

Furthermore, according to the concrete aspect of the present invention, the light source may be a solid-state light source such as a LED, an organic EL element, or the like. In this case, along with freely controlling the wavelength and the intensity of the light from the light source, it is also possible to reduce the size of the light source, and to reduce its power consumption.

The fifth aspect of the present invention, a projection type display apparatus having (a) the above described illumination apparatus, (b) a spatial light modulation device which is illuminated by illumination light which has been emitted from the illumination apparatus, and which modulates the illumination light to produce an optical image, and (c) a projection optical system which projects the optical image produced by the spatial light modulation device. Here, there is proposed a first projection type display apparatus in which, in the spatial light modulation device, there is included a display element such as a liquid crystal light valve, a digital mirror device (DMD), or the like.

With the above described projection type display apparatus since an illumination apparatus according to the present invention as previously described above is utilized, along with preventing increase in the dimensions of the projection optical system due to elongation of the illumination apparatus, also it is possible to project picture elements of high quality at high brightness by making the light from the light source more uniform.

The sixth aspect of the present invention is a projection type display apparatus having (a) a plurality of illumination apparatuses for various colors, each of which is the above described an illumination apparatus, (b) for each of the various colors, a spatial light modulation device which is illuminated by the illumination light of its corresponding color which has been emitted from the corresponding one of the illumination apparatuses, and which modulates the illumination light to produce an optical image of the corresponding color, (c) a light combination optical system which combines the optical images of the various colors modulated by the spatial light modulation devices of the corresponding colors, and (d) a projection optical system which projects an optical image produced by the combination by the light combination optical system.

With the above described second projection type display apparatus, since the illumination apparatuses according to the present invention as previously described above are utilized, along with preventing increase in the dimensions of the projection optical system due to elongation of the illumination apparatuses, also it is possible to project color picture elements of high quality at high brightness by making the light from the light sources more uniform.

DETAILED DESCRIPTION OF THE INVENTION

First Embodiment

In the following, the first preferred embodiment of the present invention will be described with reference to FIGS. 1 and 2.

Figure 1:
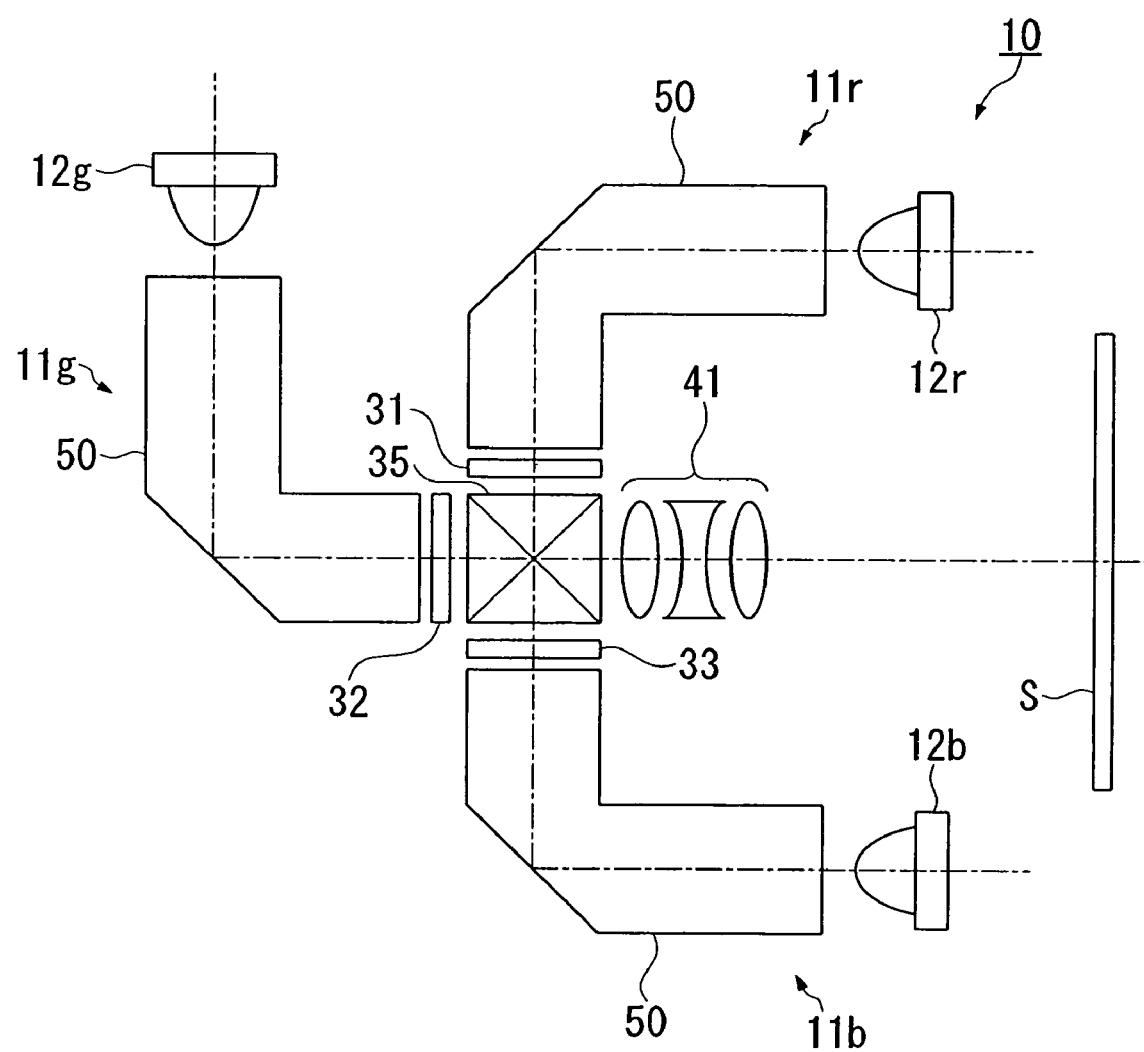
FIG. 1 is a schematic figure showing a projection type display apparatus according to a first embodiment of the present invention.

FIG. 1 is a schematic figure showing the structure of a projection type display apparatus according to a first preferred embodiment of the present invention.

As shown in FIG. 1, this projection type display apparatus according to this preferred embodiment of the present invention generally includes individual illumination apparatuses 11r, 11g, and 11b which are respectively capable of emitting beams of R, G, and B colored light; liquid crystal light valves (light modulation device) 31, 32, and 33 which respectively correspond to the R, G, and B light beams which have been emitted by the illumination apparatuses 11r, 11g, and 11b respectively; a cross dichroic prism 35 which combines the R, G, and B light beams which have been respectively modulated by the liquid crystal light valves 31, 32, and 33; and a projection lens (projection device) 41 which projects the resulting combined ray bundle upon a screen S.

The illumination apparatuses 11r, 11g, and 11b are all basically of the same structure, and accordingly, by way of example, only the illumination apparatus 11r will herein be explained.

Figure 2:
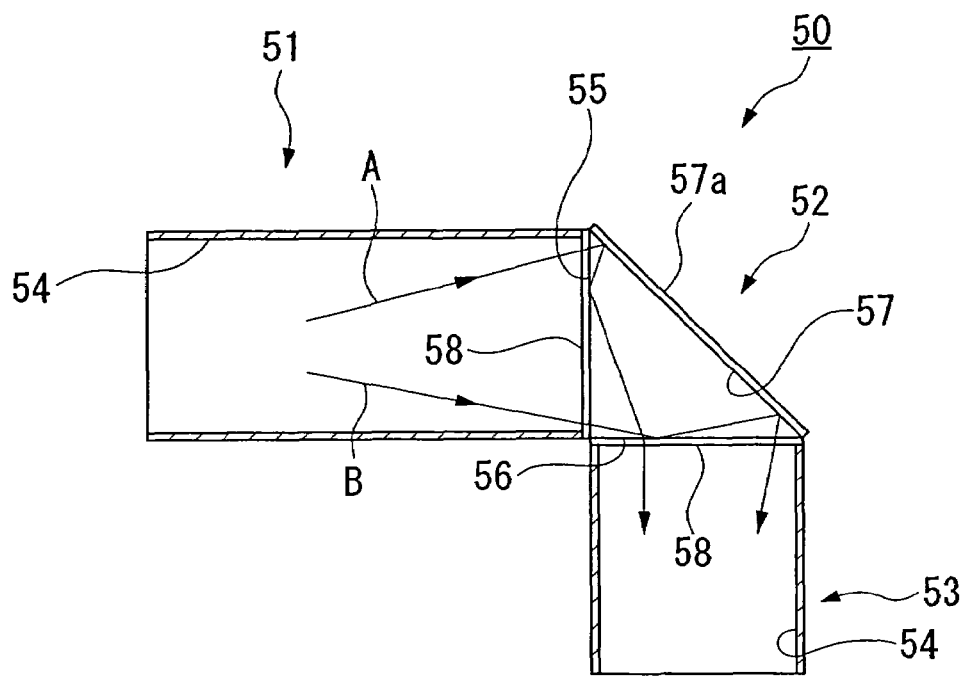
FIG. 2 is a schematic figure showing the structure of a rod integrator which is incorporated in this projection type display apparatus according to the first embodiment of the present invention.

FIG. 2 is a schematic figure showing the structure of a rod integrator 50.

The illumination apparatus 11r, as shown in FIG. 1, includes a LED (a light source) 12r which can emit red colored light, and a rod integrator (a light conducting unit) 50 which makes the distribution of the illumination which has been emitted from the LED 12r uniform.

This rod integrator 50, as shown in FIG. 2, includes an incidence side rod lens (a first light conducting unit) 51 upon which the red colored light which has been emitted from the LED 12r is incident, a triangular prism (a polygonal prism) 52 which bends (folds) the red colored light which has been emitted from the incidence side rod lens 51, and an emission side rod lens (a second light conducting unit) 53 which emits the red colored light which has thus been bent by the triangular prism 52 towards the liquid crystal light valve 31.

The incidence side rod lens 51 is formed by combining four reflective plates (reflective bodies) 54 into a tubular shape with their reflective surfaces facing to the inside, and by filling the inside of this tubular shape with air (a second medium) (whose coefficient of refraction is approximately 1.0). In addition, the emission side rod lens 53 is made in the same way as a combination of four reflective plates 54, and its interior is also filled with air.

The triangular prism 52 is made from glass (a first medium) whose coefficient of refraction has a value between about 1.45 and 1.92, differing according to the type of the glass. This triangular prism 52 has an incidence surface (a first surface) 55 which faces the incidence side rod lens 51, an emission surface (a second surface) 56 which faces the emission side rod lens 53, and a reflective surface 57 which is provided with a reflective layer (a reflective device) 57a which is adjacent to the abovementioned prism incidence surface 55 and prism emission surface 56. Reflection prevention layers 58 are provided upon the prism incidence surface 55 and upon the prism emission surface 56, and they restrict the reflection ratio of the light incident upon these surfaces. These reflection prevention layers 58 suppress reflection of light which is incident at angles less than the total reflection critical angle (which may be determined from the coefficients of refraction of the glass and of air) for the prism incidence surface 55 and the prism emission surface 56, and they are made from a material which does not hinder the total reflection of light which is incident at angles greater than said critical angle.

It should be understood that it will be acceptable provided that the nature of the material from which the triangular prism 52 is made is such that its coefficient of refraction is greater than the coefficient of refraction of the material which fills the interiors of the incidence side rod lens 51 and the emission side rod lens 53; in this case, for example, a transparent resin will be acceptable. Furthermore, conversely, it will be acceptable provided that the nature of the material which fills the interiors of the incidence side rod lens 51 and the emission side rod lens 53 is such that its coefficient of refraction is less than the coefficient of refraction of the material from which the triangular prism 52 is made; in this case, for example, a silicon gel will be acceptable. Furthermore, the triangular prism 52 is not to be considered as being limited to one in which a reflection prevention layer 58 is provided to the prism incidence surface 55 and to the prism emission surface 56; it would also be acceptable if such a reflection prevention layer were to be applied to only one or the other of the prism incidence surface 55 and the prism emission surface 56.

The liquid crystal light valves 31, 32, and 33 each includes a liquid crystal panel, an incidence side polarization plate (not shown in the drawings) and an emission side polarization plate (not shown in the drawings either), and, in this liquid crystal panel, there is employed a liquid crystal cell of the TN (Twisted Nematic) active matrix mode transparent type which employs thin film transistors (hereinafter abbreviated as TFTs) as picture element switching elements.

The cross dichroic prism 35 is made up from four right angled prisms mutually adhered together, and, on the inner surfaces thereof, a dielectric multi layered filmed film which reflects red colored light and a dielectric multi layered filmed film which reflects blue colored light are formed in a cross shape.

Next, the operation of the projection device constituted as described above will be explained.

Since the operation of all three of the illumination apparatuses 11r, 11g, and 11b is basically exactly the same, herein, only the operation of the illumination apparatus 11r will be explained, by way of example.

In the illumination apparatus 11, the colored light R which has been emitted from the LED 12r, as shown in FIG. 1, is incident upon the incidence side rod lens 51. This colored light which has been incident into the incidence side rod lens 51 is propagated while being reflected by the reflective plate 54, and is emitted after its illumination distribution has been made uniform.

The greater portion of the colored light which has been emitted from the incidence side rod lens 51 is incident upon the prism incidence surface 55 at an angle of incidence which is less than the critical angle of that prism incidence surface 55, so that it passes through the reflection prevention layer 58 and is propagated from the prism incidence surface 55 within the triangular prism 52. This colored light which has been propagated within the triangular prism 52 is reflected towards the prism emission surface 56 by the reflective layer 57a on the reflective surface 57, and is incident upon the prism emission surface 56 at an angle of incidence which is less than the critical angle of that prism emission surface 56. This colored light which has been incident upon the prism emission surface 56 passes through its reflection prevention layer 58 and is emitted from said prism emission surface 56 towards the emission side rod lens 53.

This colored light which has been emitted from the prism emission surface 56 is incident upon the emission side rod lens 53 and is propagated while being reflected by the reflective plate 54, and it is emitted towards the liquid crystal light valve 31 after its illumination distribution has been made uniform.

Furthermore, with regard to the colored light which was incident upon the incidence side rod lens 51, the colored light which is propagated along the path shown in FIG. 2 by the arrow sign A is reflected by the reflective surface 57 and is incident upon the prism incidence surface 55 from the interior side of the triangular prism 52. This colored light which is thus incident upon the prism incidence surface 55 is incident from the glass side whose coefficient of refraction is the larger toward the air side whose coefficient of refraction is the smaller, and moreover is totally reflected since it is incident upon the prism incident surface 55 at an angle of incidence which is greater than the critical angle, and it is accordingly propagated towards the prism emission surface 56 and is emitted therefrom. This colored light which has been emitted from the prism emission surface 56 is incident upon the emission side rod lens 53, and is emitted towards the liquid crystal light valve 31 after its illumination distribution has been made uniform.

Furthermore, the colored light which is propagated along the path which is shown in FIG. 2 by the arrow sign B is incident into the triangular prism 52 from the prism incidence surface 55, and is directly incident upon the prism emission surface 56. This colored light which is incident upon the prism emission surface 56 is incident from the glass side which has a coefficient of refraction which is the larger towards the air side which has a coefficient of refraction which is the smaller, and moreover is totally reflected since it is incident at an angle of incidence which is greater than the critical angle, and accordingly it is propagated towards the reflective surface 57. This colored light which is thus incident upon the reflective surface 57 is reflected towards the prism emission surface 56 and is emitted from that prism emission surface 56. And this colored light which has been emitted from the prism emission surface 56 is incident into the emission side rod lens 53, and is emitted towards the liquid crystal light valve 31 after its illumination distribution has been made uniform.

As has been described above, the beams of red, green, and blue colored light which are emitted from the illumination apparatuses 11r, 11g, and 11b respectively are incident, as shown in FIG. 1, upon the liquid crystal light valves 31, 32, and 33 for the respective colors. These beams of colored light which have thus been incident are modulated by these liquid crystal light valves 31, 32, and 33, and are emitted towards the cross dichroic prism 35. The beams of light which have thus been modulated are combined by the cross dichroic prism 35 and are emitted towards the projection lens 41. This projection lens 41 projects the combined beam of colored light towards the screen S in a magnified form.

According to the above described structure, by the rod integrator 50 being bent, its length is increased, and, along with it thereby being possible to obtain light of which the illumination distribution has been made more uniform, it is also possible to dispose the rod integrator 50 in a restricted space, whereby the freedom in disposition of the rod integrator is enhanced.

Furthermore, by comparison with a device in which the rod integrator 50 is simply bent, it is possible to eliminate light which cannot be taken advantage of for illumination of the liquid crystal light valves 31, 32, and 33 because the emission direction of such light has become too great, or light which is reflected by the bent portion in the incident direction of the light and which accordingly cannot be taken advantage of. Due to this, it is possible to eliminate loss of the light which is incident upon the rod integrator 50.

The triangular prism 52 is made up from only the prism incidence surface 55 upon which the minimum necessary amount of colored light is incident, the reflective surface 57 upon which the reflective layer 57a is provided, and the prism emission surface 56 at which the colored light is emitted. Due to this, the present invention can be advantageously applied to the manufacture of a compact rod integrator which does not require any unnecessary space.

Furthermore, since the device has no surfaces which are not utilized, accordingly no light can leak from such surfaces, and therefore the efficiency of utilization of the light which is incident upon this rod integrator 50 is not deteriorated by such leakage.

It is possible to enhance the efficiency of utilization of the light which is incident upon the rod integrator 50 by providing the reflection prevention layer 58, since reflection of the light which is incident at angles less than the critical angles for the prism incidence surface 55 and the prism emission surface 56 is reduced. It should be understood that there is no loss of efficiency of utilization of the light which is incident upon the rod integrator, even though the reflective layer 58 is provided, since there is no hindrance to the total reflection of the light which is incident at angles greater than the critical angle.

The illumination distributions of the light which is incident upon the incidence side rod lens 51 and of the light which is incident upon the emission side rod lens 53 are made more uniform by this reflection from the reflective plate 54. Since all the light which is incident upon the reflective plate 54 is reflected, there is no leakage of the light when it is reflected.

Due to this, it is possible to prevent any loss of the light which is incident upon the incidence side rod lens 51 and upon the emission side rod lens 53.

Second Embodiment

In the following, the second preferred embodiment of the present invention will be described with reference to FIGS. 3 and 4.

The basic structure of this projection type display apparatus according to the second preferred embodiment of the present invention is the same as that of the projection type display apparatus of the first preferred embodiment, but the structure of the rod integrators is different from that in the first preferred embodiment. Accordingly, for this second preferred embodiment, only the portions in the neighborhood of the rod integrators will be explained using FIGS. 3 and 4, and the explanation of the liquid crystal light valves and so on will be curtailed.

Figure 3:
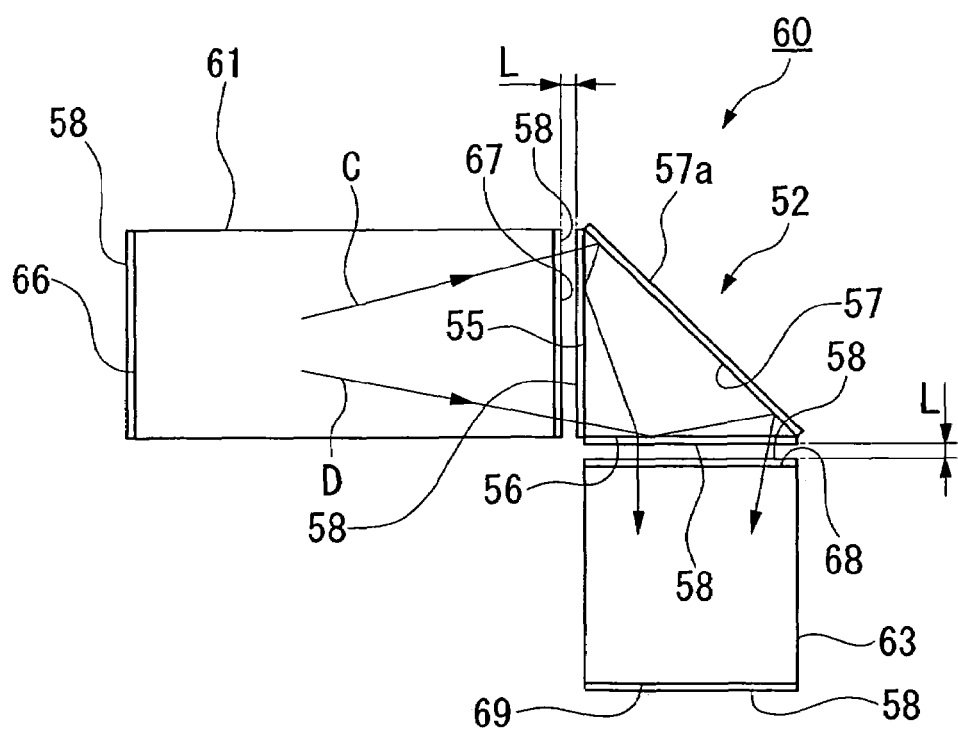
FIG. 3 is a schematic figure showing the structure of a rod integrator which is incorporated in a projection type display apparatus according to a second embodiment of the present invention.

FIG. 3 is a schematic figure showing the structure of the one of the rod integrators 60 which are incorporated in this projection type display apparatus according to the second preferred embodiment of the present invention which corresponds to the red colored light; the structures of the corresponding rod integrators for the green colored light and for the blue colored light are similar, and hence will not be particularly described.

This rod integrator (light conducting unit) 60, as shown in FIG. 3, includes an incidence side rod lens (a first light conducting unit) 61 upon which the colored light which has been emitted from the LED 12r is incident, a triangular prism 52 which folds and bends round this colored light which has been emitted from the incidence side rod lens 61, and an emission side rod lens (a second light conducting unit) 63 from which the colored light which has thus been bent and folded is emitted towards the liquid crystal light valve 31.

The incidence side rod lens 61 and the emission side rod lens 63 are made in the form of rectangular pillars using a glass (a third medium) whose coefficient of refraction has a value between about 1.45 and about 1.92, according to the type of glass. Along with the surface of the incidence side rod lens 61 which faces the LED 12r being made as a first incidence surface 66 upon which the red colored light therefrom is incident, this side rod lens 61 is also made with a first emission surface 61 which faces the prism incidence surface 55 of the triangular prism 52, and which emits the red colored light. In addition, similarly, along with the surface of the emission side rod lens 63 which faces the prism emission surface 56 of the triangular prism 52 being made as a second incidence surface 68, the surface of this emission side rod lens 63 which faces the liquid crystal light valve 31 is also formed as a second emission surface 69 which emits the red colored light. In addition, reflection prevention layers 68 are provided upon this first incidence surface 66, this first emission surface 67, this second incidence surface 68, and this second emission surface 69.

It should be understood that the incidence side rod lens 61 and the emission side rod lens 63 are not to be considered as being limited to ones upon which such reflection prevention layers 58 are provided over all of the first incidence surface 66, the first emission surface 67, the second incidence surface 68, and the second emission surface 69 as described above; it would be acceptable for at least one of these surfaces to be provided with such a reflection prevention layer.

Furthermore, a gap L is provided between the first emission surface 67 and the prism incidence surface 55, and a similar gap L is provided between the second incidence surface 68 and the prism emission surface 56, and these gaps) are filled with air. As for the dimensions of these gaps L, they are formed between a lower limit of the product of the wavelength of the colored light which is being propagated through them (i.e., of red light in this case) and the coefficient of refraction of air, and an upper limit of about 0.1 mm.

It should be understood that the nature of the material from which this incidence side rod lens 61 and this emission side rod lens 63 are formed is such that it is endowed with a coefficient of refraction which is higher than the coefficient of refraction of the material which is present around them (in this case, air), and this material may, for example, be a transparent resin.

Furthermore, as the material which fills the gaps L, it will be acceptable provided that it is a material which is endowed with a coefficient of refraction which is lower than the coefficient of refraction of the material from which the triangular prism 52 is made; for example, silicon gel may be used.

Figure 4:
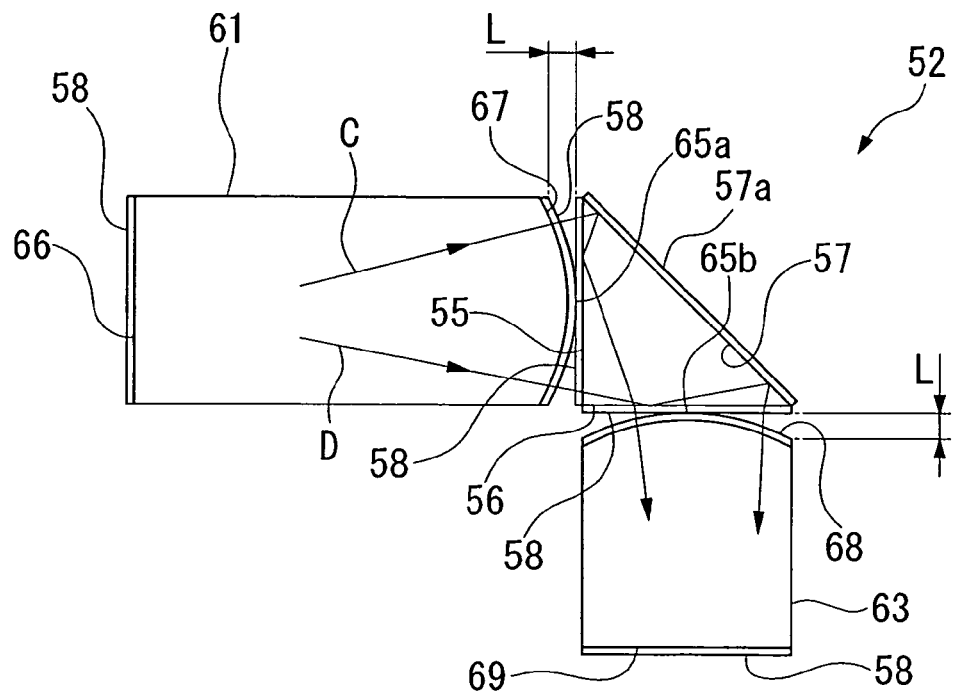
FIG. 4 is a schematic figure showing a variant embodiment of this rod integrator which is incorporated in the second embodiment of the present invention.
Figure 5:
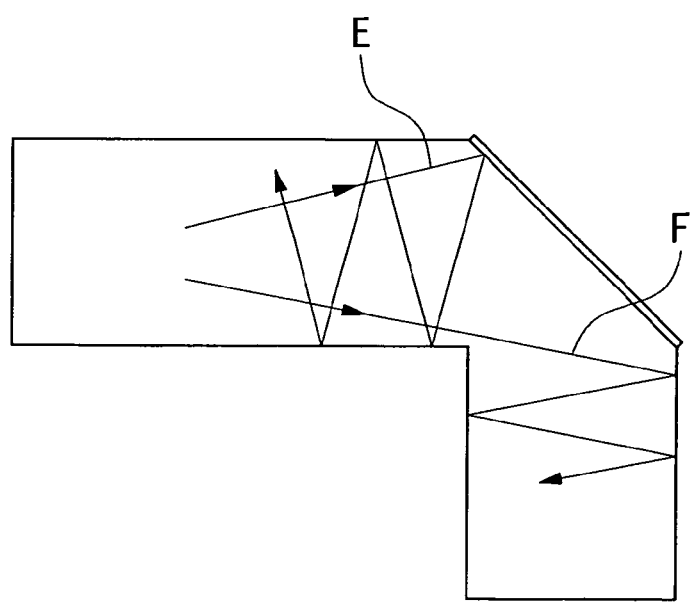
FIG. 5 is a schematic figure showing the structure of a prior art rod integrator.

FIG. 4 is a schematic figure showing a variant embodiment of this rod integrator which is incorporated in the second preferred embodiment of the present invention.

It should be understood that, as shown in FIG. 4, a first convex portion 65a is formed roughly in the central portion of the first emission surface 67, and similarly a second convex portion 65b is formed roughly in the center of the second incidence surface 68, and the members may be arranged so that the first convex portion 65a of the first emission surface 67 is in contact with the prism incidence surface 55, and similarly so that the second convex portion 65b of the second incident surface 68 is in contact with the prism emission surface 56.

Next, the operation of the rod integrator 60 having the above described structure will be explained.

The red colored light which is incident upon the incidence side rod lens 61 from its first incidence surface 66 through its reflection prevention layer 58 is propagated while being totally internally reflected by the boundary surfaces which are parallel to the lengthwise axial direction of the incidence side rod lens 61, and is emitted from the first emission surface 67 through its reflection prevention layer 58 after its illumination distribution has been made more uniform.

The red colored light which has been emitted from the first emission surface 67 is incident upon the prism incidence surface 55 at an angle of incidence which is less than the critical angle at this prism incidence surface 55, and passes through the reflection prevention layer 58 and is propagated from the prism incidence surface 55 within the triangular prism 52. This red colored light which is propagated within the triangular prism 52 is reflected by the reflective layer 57a upon the reflective surface 57 towards the prism emission surface 56, and is incident upon this prism emission surface 56 at an angle which is less than the critical angle at this prism emission surface 56. And this red colored light which is thus incident upon the prism emission surface 56 passes through the reflection prevention layer 58 thereupon and is emitted from the prism emission surface 56 towards the second incidence surface 68.

The red colored light which has been emitted from the prism emission surface 56 is incident upon the second incidence surface 68 and passes through its reflection prevention layer 58, and is propagated within the emission side rod lens 63. And this light which is propagated within the emission side rod lens 63 is propagated while being totally internally reflected from the boundary surfaces which are parallel to the lengthwise axial direction of said emission side rod lens 63, and is emitted from the second emission surface 69 through its reflection prevention layer 58 after its illumination distribution has been made yet more uniform.

Furthermore, the portion of the red colored light which is incident upon the incidence side rod lens 61 and which is propagated along the path shown in FIG. 3 by the arrow sign C is reflected by the reflective surface 57 and is incident from the interior of the triangular prism 52 upon its prism incidence surface 55. Since this colored light which is thus incident upon the prism incidence surface 55 is incident from the side of the glass whose coefficient of refraction is the larger towards the side of the air whose coefficient of refraction is the smaller, and since moreover it is incident at an angle of incidence which is greater than the critical angle at the prism incidence surface 55, accordingly it is totally internally reflected, and is propagated towards the prism emission surface 56 and is emitted therefrom. And this red colored light which has been emitted from the prism emission surface 56 is incident upon the emission side rod lens 63, and is emitted therefrom after its illumination distribution has been made yet more uniform.

Furthermore, the portion of the red colored light which is propagated along the path shown by the arrow sign D in FIG. 3 is incident into the triangular prism 52 from its prism incidence surface 55, and is then directly incident upon the prism emission surface 56. And since this red colored light which is incident upon the prism emission surface 56 is incident from the side of the glass whose coefficient of refraction is the larger towards the side of the air whose coefficient of refraction is the smaller, and since moreover it is incident at an angle of incidence which is greater than the critical angle at this prism emission surface 56, accordingly it is totally internally reflected, and is propagated towards the reflective surface 57. This red colored light which is incident upon the reflective surface 57 is then reflected towards the prism emission surface 56 and is emitted from this prism emission surface 56. In addition, this red colored light which has been emitted from the prism emission surface 66 is incident upon the emission side rod lens 63, and is emitted therefrom after its illumination distribution has been made yet more uniform.

According to the above described structure, since the light which is being propagated at a large angle with respect to the lengthwise axial directions of the incident side rod lens 61 and the emission side rod lens 63 and which thus cannot be taken advantage of for illumination of the liquid crystal light valves 31, 32, and 33 is incident at a small angle of incidence to the boundary surfaces which are parallel to said longitudinal axial directions, accordingly it passes through the above described boundary surfaces and leaks out to the exterior of the device. The remainder of the light is totally internally reflected due to the difference between the coefficients of refraction of the glass and of the air, since it is incident upon the above described boundary surfaces at angles of incidence which are relatively large.

Due to this, the proportion of the light in the light which has been emitted from the emission side rod lens 63 which cannot be taken advantage of for illumination of the liquid crystal light valves 31, 32, and 33 is relatively small. In other words, it is possible to enhance the utilization efficiency for the light which has been emitted from the emission side rod lens 63.

By providing the reflection prevention layers 58, it is possible to enhance the efficiency of utilization of the light which is incident upon the rod integrator 60, since reflection of the light which is incident at angles less than the critical angles upon the first incidence surface 66, the first emission surface 67, the second incidence surface 68, and the second incidence surface 69 is reduced. It should be understood that there is no loss of the efficiency of utilization of the light which is incident upon the rod integrator 60 even if the reflection prevention layers 58 are provided, since no hindrance is imposed upon the total internal reflection of the light which is incident at angles which are greater than the critical angle.

The gaps L between the first emission surface 67 and the prism incidence surface 55, and between the second incidence surface 68 and the prism emission surface 56, are formed to be wider than the product of the coefficient of refraction of air and the wavelength of the colored light which is being transmitted across said gaps L. Due to this, the widths of the above described gaps L are made to be wider than the evanescent wave propagation depth, so that it is possible to prevent light which has been incident under conditions which should produce total internal reflection from being transmitted through these gaps L. In other words, it is possible to prevent deterioration of the efficiency of utilization of the light which is incident.

Furthermore, since the above described gaps L are made to be narrower than 0.1 mm, it is possible to reduce the proportion of the light which leaks out from the above described gap L to the exterior of this rod integrator 60, and the proportion of the light which is incident at a large angle of incidence upon the second incidence surface 68 after having passed through the above described gap L from the first emission surface 67 and which accordingly cannot be taken advantage of for illumination of the liquid crystal light valves 31, 32, and 33. In other words, it is possible to prevent deterioration of the efficiency of utilization of the light which is incident.

Since the convex portion 65a of the first emission surface 67 and the prism incidence surface 55, and the convex portion 65b of the second incidence surface 68 and the prism emission surface 56, are in contact with one another, accordingly the gaps L are defined between the portion of the first emission surface 67 surrounding the convex portion 65 and the prism incidence surface 55, and between the portion of the second incidence surface 68 surrounding the convex portion 65b and the prism emission surface 56. Since the portions of the prism incidence surface 55 and of the prism emission surface 56 at which total internal reflection of the red colored light takes place are these surrounding edge portions, accordingly the portions at which the gaps L are necessary are the above described surrounding edge portions, so that no problem occurs due to total internal reflection in the roughly central portions of these surfaces, even though no gaps are formed there. In other words, it is possible to prevent deterioration of the efficiency of utilization of the light which is incident.

Furthermore, the adjustment of the gap L is easy since it is possible to adjust the gap L by adjusting the height of the convex portions 65a and 65b, and accordingly the construction of this rod integrator 60 becomes easy.

It should be understood that the technical scope of the present invention is not to be considered as being limited to the above described preferred embodiment thereof; rather, it is possible to supplement various changes to the scope of the present invention, provided that its gist is not departed from.

For example although, in the above described third preferred embodiment of the present invention, the explanation was made in terms of an example in which the light sources of the illumination apparatuses were implemented as LEDs, in fact these light sources are not to be considered as being limited to being LEDs; it would also be possible, for example, to apply the present invention to the cases of various other types of light sources, such as halogen lamps or the like.

Furthermore although, in the above described third preferred embodiment of the present invention, the explanation was made in terms of an example in which the rod integrators were angled through about 90°, in fact this angle of 90° is not to be taken as being limitative of the present invention; it would be possible to apply the present invention to cases in which these rod integrator angles assumed various other values.

Third Embodiment

Figure 6:
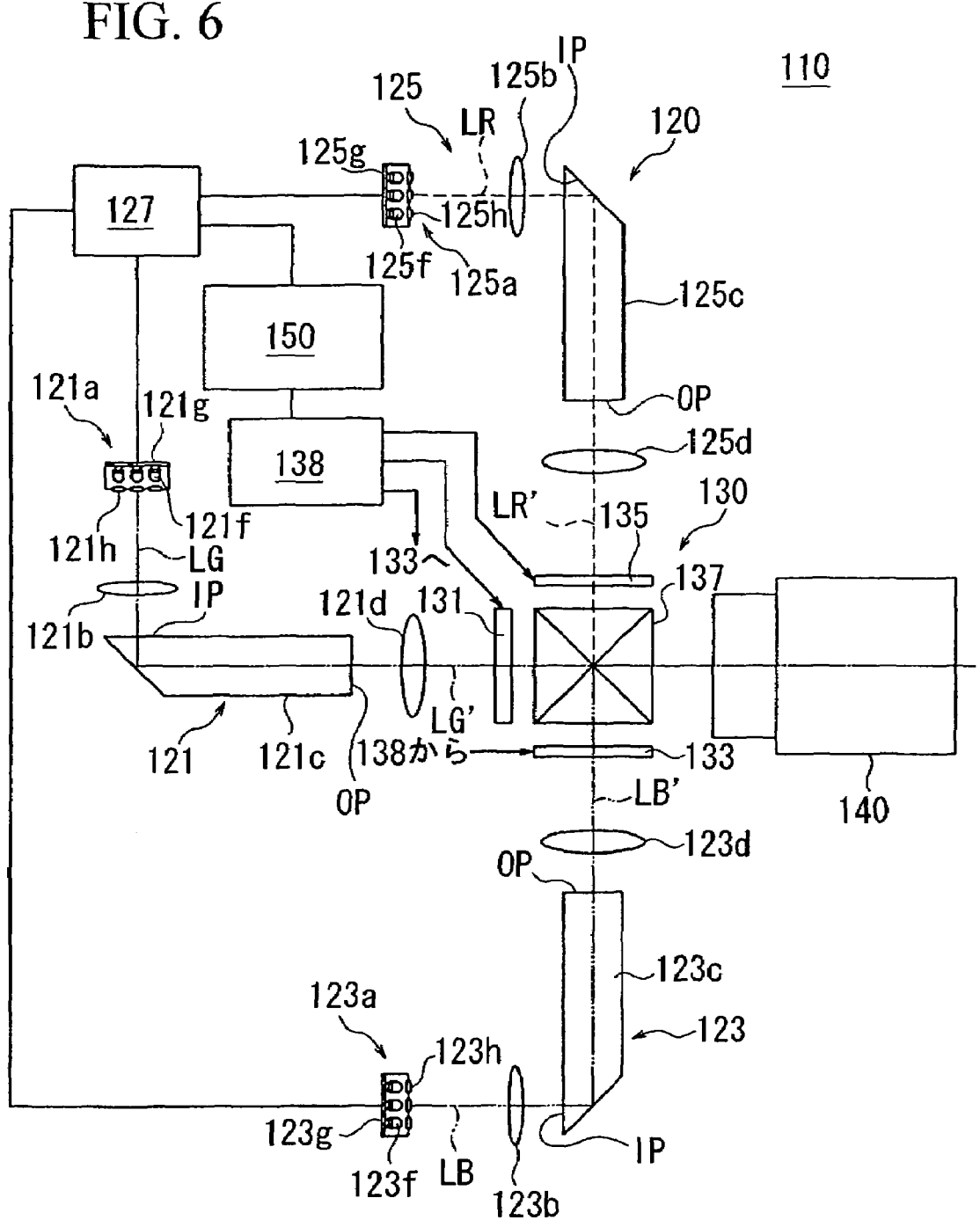
FIG. 6 is a schematic figure showing the structure of a projection type display apparatus according to a third embodiment of the present invention.

FIG. 6 is a block diagram for general explanation of the structure of a projection type display apparatus (i.e., a projector) according to a third preferred embodiment of the present invention. This projector 110 comprises an illumination apparatus 120, a light modulation device 130, a projection lens 140, and a control device 150. Here, the illumination apparatus 120 includes a green (G) colored light illumination apparatus 121, a blue (B) colored light illumination apparatus 123, a red (R) colored light illumination apparatus 125, and a light source drive device 127. Furthermore, the light modulation device 130 comprises three liquid crystal light valves 131, 133, and 135 which are spatial light modulation devices, a cross dichroic prism 137 which is a light combination optical system, and an element light drive device 138 which outputs drive signals for the liquid crystal light valves 131, 133, and 135.

The illumination apparatus G comprises a light source unit 121a for green (G) colored light, a first condensing lens 121b, an integrator optical system 121c, and a second condensing lens 121d. Herein, the light source unit 121a for green colored light is made up by fitting a plurality of LEDs 121f, which may be termed solid state light sources, in an appropriate two dimensional array upon a circuit base board 121g, and it also comprises optical members 121h which are lens elements which are individually disposed for shaping the beams at the front of each of the LEDs 121c. Each of the LEDs 121f generates its own beam of green (G) light, which is included in the range of green (G) light, which is one of the three primary colors. The green (G) light which is emitted from the LEDs 121f, in other words the first light source light beam LG, after having passed through the optical members 121h and the first condensing lens 121b, is incident upon an incident port IP of the integrator optical system 121c, which is a light uniformization means. At this time, the light from each of the LEDs 121f is made into a suitably converged beam by the first condensing lens 121b, and is converged by the first condensing lens 121b without any waste, and then these beams are mutually superimposed and are incident upon the incident port IP of the integrator optical system 121c. The first illumination light LG' which has passed through the integrator optical system 121c and has been emitted from its emission port OP is incident via the second condensing lens 121d upon the liquid crystal light valve 131 for green (G) light in the light modulation device 130. Due to this, the illumination reception region (the picture element information creation region) of the liquid crystal light valve 131 is uniformly illuminated with green (G) light. In the above, the topping lenses of the LEDs 121f, the optical members 121h, and the first condensing lens 121b constitute a light condensing means which condenses the light LG of the first light source LG to a suitable extent.

Figure 7:
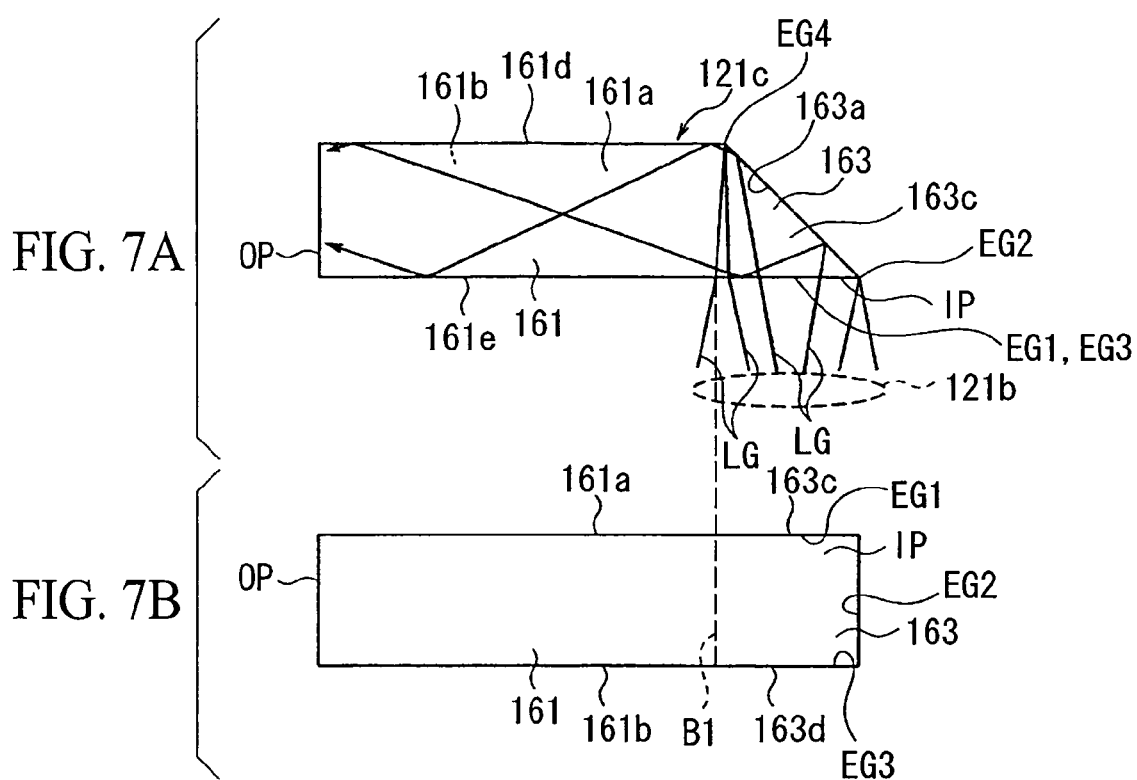
FIGS. 7A and 7B are respectively a plan view and a side view showing an integrator optical system.

In the following, the structure and the function of the integrator optical system 121c will be described with reference to FIGS. 7A through 8. It should be understood that FIG. 7A is a plan view of this integrator optical system 121c, while FIG. 7B is a side view of said integrator optical system 121c. Furthermore, FIG. 8 is an enlarged view showing an end portion of the integrator optical system 121c.

This integrator optical system 121c is a four cornered transparent post shaped member which is made by processing glass, and, at one of its ends, it has an external shape which is made by cutting off this four cornered post shape at an angle of inclination of 45°. In other words, this integrator optical system 121c is made up from a four cornered post shaped rod integrator main body 161c which has a rectangular cross section, and a right angled prism portion 163 which is provided at one end of said rod integrator main body 161. Among these, the rod integrator main body 161 has a first pair of mutually opposing side surfaces 161a and 161b, and a second pair of mutually opposing side surfaces 161d and 161e which are formed so as to be orthogonal to the first pair of side surfaces 161a and 161b. On the other hand, the right angled prism portion 163 comprises a inclined end surface 163a which functions as a side surface which corresponds to its hypotenuse, and this inclined end surface 163a is perpendicular to the first pair of side surfaces 161a and 161b, while making an angle of 45° with respect to the one 161d of the second pair of side surfaces; and it is able to totally internal reflect the light LG from the light source which has passed through an incident port IP which is a transparent window surface portion.

The light LG from the light source which has been incident upon the incident port IP of this integrator optical system 121c is directly incident upon the inclined end surface 163a which opposes said incident port, or is incident upon said inclined end surface 163a after having been reflected by the pair of end surface portions 163c, 163d of the right angled prism portion 163 or the like. The light LG from the light source which has been incident upon the inclined end surface 163a is totally internally reflected by this inclined end surface 163a and its optical path is bent around without any loss, so that it is conducted to the rod integrator main body 161. At this time, the light LG from the light source is incident upon the interior of the incident port IP, in other words inside the edges EG1, EG2, and EG3 as shown in FIG. 8. Furthermore, the light LG from the light source is incident beyond the line of intersection EG4 between the side surface 161d of the rod integrator main body 161 and the inclined end surface 163a of the right angled prism portion 163, more towards the side of the inclined end surface 163a. As a result, the light LG from the light source is incident upon the incident port IP inside of the boundary line B1. Furthermore if, before or after the light LG from the light source is incident upon the inclined end surface 163a, it is incident upon the inner surfaces such as the end surface portions 163c and 163d and so on which define the right angled prism portion 163, then this light LG from the light source is totally internally reflected at these inner surfaces. In other words, the right angled prism portion 163 also functions as an integrator.

Figure 8:
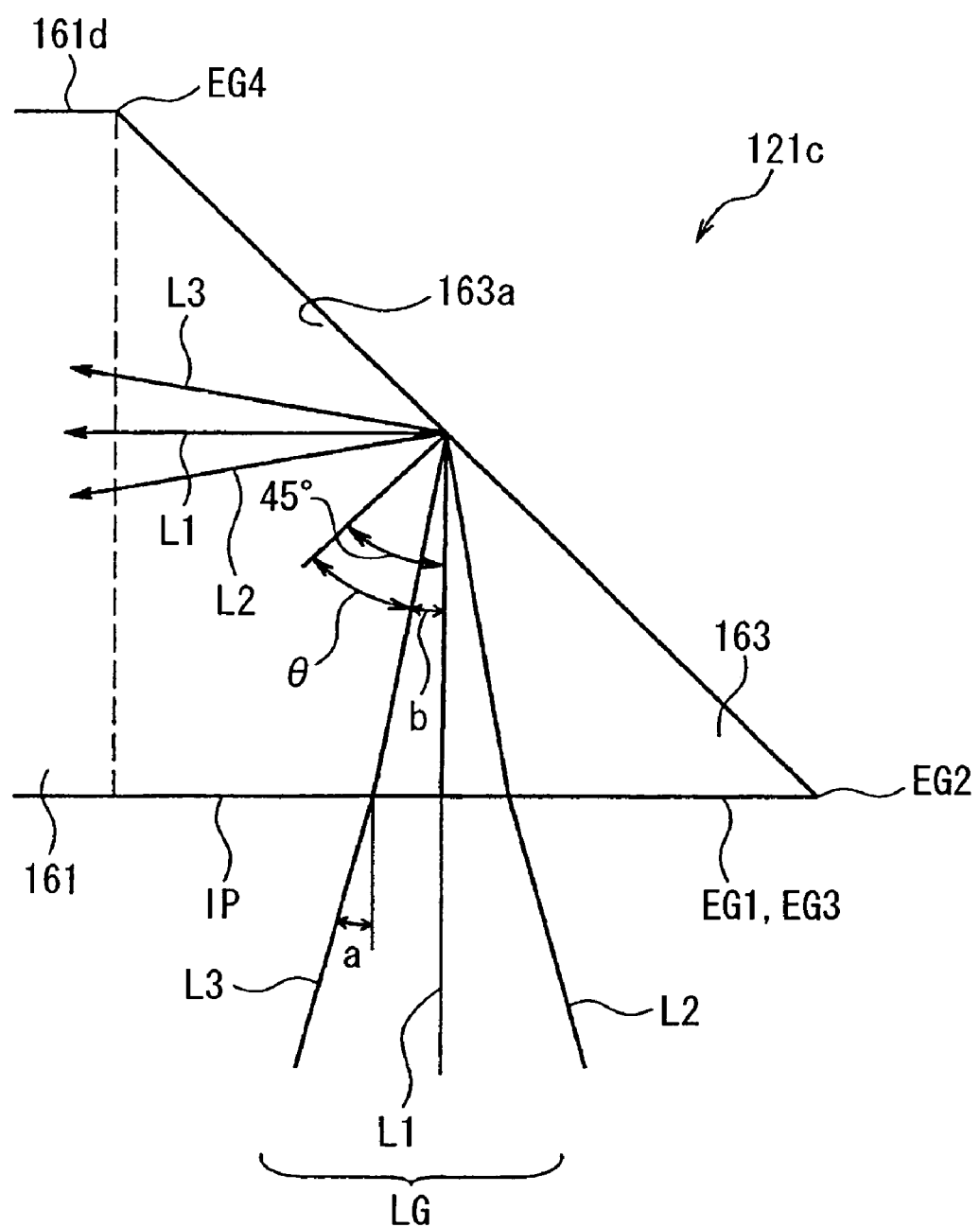
FIG. 8 is an explanatory figure for explanation of a right angled prism end portion of the integrator optical system of FIGS. 7A and 7B.

As shown in FIG. 8, the light ray L1 which is parallel to the optical axis in the light LG which is incident from the incident port IP upon the right angled prism portion 163 is bent through an angle of 90° by being totally internally reflected by the inclined end surface 163a which is provided to the right angled prism portion 163, and is incident upon the rod integrator main body 161, and proceeds along the axial direction of the rod integrator main body 161. Furthermore, the light LG from the light source which is incident upon the right angled prism portion 163 has a certain angular range, and the light ray L2 which is inclined at the maximum angle on the one side with respect to the optical axis is refracted by the incident port IP, and, just like the light ray L1, is totally internally reflected by the inclined end surface 163a. Furthermore, the light ray L3 which is inclined at the maximum angle on the other side with respect to the optical axis is refracted by the incident port IP, and, just like the light ray L2, is totally internally reflected by the inclined end surface 163a.

Here, the condition for total internal reflection by the inclined end surface 163a of the light rays L1 through L3 which are incident upon the right angled prism portion 163 should be considered. Thus, the light ray L3 is considered for which the occurrence of this total internal reflection is the most difficult. If the angle of incidence from air upon the incident port IP is termed a, the coefficient of refraction of the rod integrator main body 161 and of the right angled prism portion 163 is termed n, and the angle of refraction within the glass, in other words within the right angled prism portion 163, is termed b, then b is given by:

$$b = \sin^{-1}((\sin a)/n)$$

On the other hand, the critical angle θc for total internal reflection of the angle of incidence θ=(45°−b) at the inclined end surface 163a is given by:

$$\theta c = \sin^{-1}(1/n)$$

and, if θ is greater than θc, then the light ray L3 is totally internally reflected at the inclined end surface 163a. In concrete terms, if the coefficient of refraction n of the glass is taken as n=1.7581, and the angle of incidence, which corresponds to the angular range of the light LG from the light source, is taken as a=18°, then the angle of refraction b becomes b=10.1°, and the minimum angle of incidence θ becomes θ=34.9°. On the other hand, since the critical angle θc is 34.7°, all of the light rays L1 through L3 come to be totally internally reflected by the inclined end surface 163a. In other words, simply by adjusting the coefficient of refraction of the right angled prism portion 163, and without providing any reflective layer upon the inclined end surface 163a, it is possible to direct the light LG from the light source which is incident from the incident port IP towards the rod integrator main body 161 by 100% total internal reflection with the right angled prism portion 163 which is perpendicular thereto. It should be understood that, if a reflective layer made from a dielectric or aluminum or the like is formed upon the inclined end surface 163a, it is necessary to prevent formation of this reflective layer from spreading to the portions surrounding the inclined end surface 163a, and accordingly the manufacturing cost of the right angled prism portion 163, in other words of the integrator optical system 121c as a whole, is increased.

Returning to the discussion of FIG. 6, the blue (B) light illumination apparatus 123 includes a light source unit 123a for blue (B) light, a first condensing lens 123b, an integrator optical system 123c, and a second condensing lens 123d. Among these, the light source unit 123a for blue (B) light has the same structure as the light source unit 121a for green (G) light, but the LEDs 123f upon the circuit base board 123g are ones which generate blue (B) light which is included in the range of blue (B) light which is one of the three primary colors, and the light LB from the second light source which consists of this blue (B) light is incident via the optical members 123h and the first condensing lens 123b upon the integrator optical system 123c. The detailed explanation of this integrator optical system 123c will herein be curtailed, since it has the same structure as that of the integrator optical system 121c for green (G) colored light, as shown in FIGS. 7A, 7B, and 8. The second illumination light LB' which has passed through this integrator optical system 123c is made uniform by wave front splitting and superposition without any losses, and is incident via the second condensing lens 123d upon the liquid crystal light valve 133 for blue (B) light of the light modulation device 130. Due to this, the illumination reception region (the picture element information creation region) upon the liquid crystal light valve 133 is uniformly illuminated with blue (B) light.

In addition, as for the red (R) light illumination apparatus 125, it comprises a light source unit 125a for red (R) light, a first condensing lens 125b, an integrator optical system 125c, and a second condensing lens 125d. Among these, the light source unit 125a for red (R) light has the same structure as the light source unit 121a for green (G) light and the light source unit 123a for blue (B) light, but the LEDs 125f upon the circuit base board 125g are ones which generate red (R) light which is included in the range of red (R) light which is one of the three primary colors, and the light LR from the third light source which consists of this red (R) light is incident via the optical members 125h and the first condensing lens 125b upon the integrator optical system 123c. The detailed explanation of this integrator optical system 125c will herein be curtailed, since it has the same structure as those of the integrator optical system 121c for green (G) colored light and of the integrator optical system 123c for blue (B) colored light, as shown in FIGS. 7A, 7B, and 8. The third illumination light LR' which has passed through this integrator optical system 125c is made uniform by wave front splitting and superposition without any losses, and is incident via the second condensing lens 125d upon the liquid crystal light valve 135 for red (R) light of the light modulation device 130. Due to this, the illumination reception region (the picture element information creation region) upon the liquid crystal light valve 135 is uniformly illuminated with red (R) light.

It should be understood that, in the example shown in the drawings, the first condensing lenses 121b through 125b are arranged between the light source units 121a through 125a for each of the colors and the corresponding integrator optical systems 121d through 125d and the second condensing lenses 121b through 125b are arranged between the corresponding integrator optical systems 121c through 125c and the corresponding liquid crystal light valves 131 through 135 for each of the colors; but it would also be possible, as an alternative, if appropriate, to omit either the first condensing lenses 121b through 125b or the second condensing lenses 121d through 125d, according to variation of the size of the integrator optical systems 121c through 125c or the like. Furthermore, it would also be possible to dispose, between the light source units 121a through 125a and the first condensing lenses 121b through 125b, polarization variation elements for standardizing the illumination light which is incident upon the liquid crystal light valves 131 through 135 to S polarization or to P polarization, for example.

The light from the light illumination apparatuses 121, 123, and 125 of the various primary colors which is incident upon each of the liquid crystal light valves 131, 133, and 135 respectively is modulated in two dimensions by these liquid crystal light valves 131, 133, and 135. After the respective light beams have passed through the liquid crystal light valves 131, 133, and 135, they are combined by the cross dichroic prism 137, and are emitted from the one side surface thereof. The image which is formed in this manner by the combined light beams which are emitted from the cross dichroic prism 137 is incident upon the projection lens 140, which constitutes a projection optical system, and is projected at an appropriate magnification upon a screen (not shown in the figures). In other words, the color picture elements which have been formed by combining the picture elements of each color red (R), green (G), and blue (B) which have been formed by the respective liquid crystal light valves 131, 133, and 135 are projected by the projector 110 upon the screen as a moving image or as a still image. It should be understood that polarization plates are provided in suitable positions in the vicinity of the liquid crystal light valves 131, 133, and 135, in order to illuminate these liquid crystal light valves 131, 133, and 135 with polarized light and in order to read it out, although these arrangements are not shown in the figures.

The control device 150 outputs control signals to the light source drive device 127, and causes light to be generated at appropriate timings from the LEDs 121f, 123f, and 125f incorporated in the first through the third light source units 121a, 123a, and 125a which are provided to the colored light illumination apparatuses 121, 123, and 125. Furthermore, this control device 150 outputs control signals to the element drive device 138, and forms a two dimensional polarization distribution in each of the liquid crystal light valves 131, 133, and 135 in correspondence to the desired intensity for the projected picture elements.

In the following, the operation of the projector 110 shown in FIG. 6 will be explained.

The illumination light beams of the various primary colors from the green (G) light illumination apparatus 121, the blue (B) light illumination apparatus 123, and the red (R) light illumination apparatus 125 which are provided to the illumination apparatus 120 are incident upon the corresponding liquid crystal light valves 131, 133, and 135 respectively. Each of these liquid crystal light valves 131, 133, and 135 is modulated by the element drive device 138 which operates according to the picture element signal from the exterior, so that it is endowed with a two dimensional coefficient of refraction distribution, and thereby the illumination light beams of the various primary colors are modulated two dimensionally in units of picture elements. In this manner, the illumination light which has been modulated by the liquid crystal light valves 131, 133, and 135, in other words the picture light, after having been combined by the cross dichroic prism 137, is incident upon the projection lens 140 which constitutes the projection optical system, and is projected upon the screen (not shown in the figures). In this case, since the integrator optical systems 121c through 125c which are provided to the green (G), blue (B), and red (R) illumination apparatuses 121, 123, and 125 totally internally reflect the light beams LG through LR from the light sources of the various colors with the right angled prism portions 163 and conduct them to the rod integrator main body 161 which is orthogonal thereto, accordingly it is possible to enhance the freedom of choice for the arrangement and the size of the illumination apparatus 120, and, as a result, it is possible to make the illumination apparatus 120 more compact. It should be understood that the rod integrator main bodies 161 function as rod lenses for performing wavefront splitting and superimposition of the light beams LG through LR from the light sources, while also total internal reflection is generated in the right angled prism portions 163, not only by the inclined end surfaces 163a thereof, but also by the end surface portions 163c, 163d and so on as well. Accordingly, in practice, by elongating the rod lenses, it is possible to make the illumination light beams LG through LR from the light sources yet more uniform by a further stage.

Fourth Embodiment

In the following, a projection type display apparatus (a projector) according to the fourth preferred embodiment of the present invention will be described.

This projector according to the fourth preferred embodiment of the present invention is one which is made by implementing certain changes to the projector of the third preferred embodiment described above, and accordingly the description of the common portions will be curtailed, and only the portions of this fourth preferred embodiment which differ from the third preferred embodiment described above will be explained.

Figure 9:
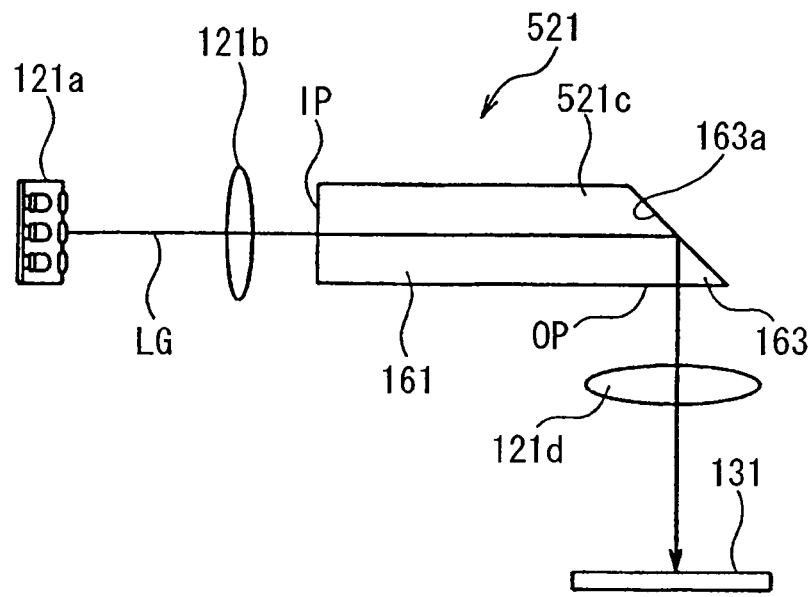
FIG. 9 is an explanatory figure for explanation of the essential portions of a projection type display apparatus according to a fourth embodiment of the present invention.

FIG. 9 is an explanatory figure for explanation of the essential portions of this projection type display apparatus according to the fourth preferred embodiment of the present invention. In this case, the rod integrator main body 161 is provided upon the side of the incident port IP of the integrator optical system 521 which constitutes the illumination apparatus, and the right angled prism portion 163 is provided upon the side of its emission port OP. The form of the integrator optical system 521c itself is the same as for the third preferred embodiment of the present invention, as shown in FIGS. 7A, 7B, and 8. With this illumination apparatus, it is possible to direct the light LG from the light source from a direction which is perpendicular to the optical axis of the liquid crystal light valve 131 by taking advantage of the inclined end surface 163a which is provided to the right angled prism portion 163. It should be understood that although, in this case, only the illumination apparatus 521 for the green (G) light has been explained, the other illumination apparatuses for the blue (B) light and for the red (R) light also have the same structure as the illumination apparatus 521 for the green (G) light, and they also include integrator optical systems which are the same as the integrator optical system 521c shown in the drawing.

Fifth Embodiment

In the following, a projection type display apparatus (a projector) according to the fifth preferred embodiment of the present invention will be described.

Figure 10:
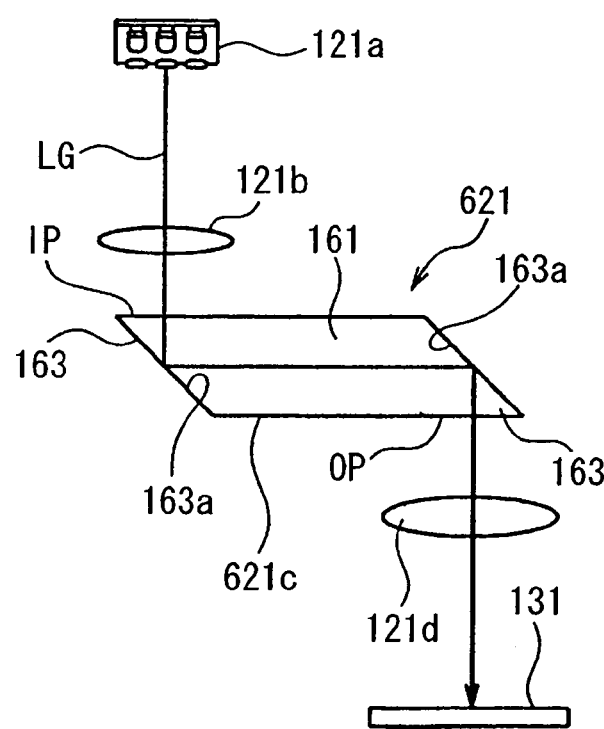
FIG. 10 is an explanatory figure for explanation of the essential portions of a projection type display apparatus according to a fifth embodiment of the present invention.

This projector according to the fifth preferred embodiment of the present invention is a variant of the projector of the third preferred embodiment described above. FIG. 10 is an explanatory figure for explanation of the essential portions of this projection type display apparatus according to the fifth preferred embodiment of the present invention.

In this case, right angled prism portions 163 are provided at opposite ends of the rod integrator main body 161 which constitutes the illumination apparatus, i.e. both at the incident port IP side and also at the emission port OP side of the integrator optical system 621c. With this illumination apparatus, it is possible to direct the light LG from the light source from directions which are somewhat deviated with respect to the optical axis of the liquid crystal light valve 131 by taking advantage of the pair of inclined end surfaces 163a which are provided to the pair of right angled prism portions 163. Again it should be understood that although, in this case, only the illumination apparatus 621 for the green (G) light has been explained, the other illumination apparatuses for the blue (B) light and for the red (R) light also have the same structure as the illumination apparatus 621 for the green (G) light, and they also include integrator optical systems which are the same as the integrator optical system 621c shown in the drawing.

Sixth Embodiment

In the following, a projection type display apparatus (a projector) according to the sixth preferred embodiment of the present invention will be described. This projector is a projector which utilizes SCR (Sequential Color Recapture) technology.

Figure 11:
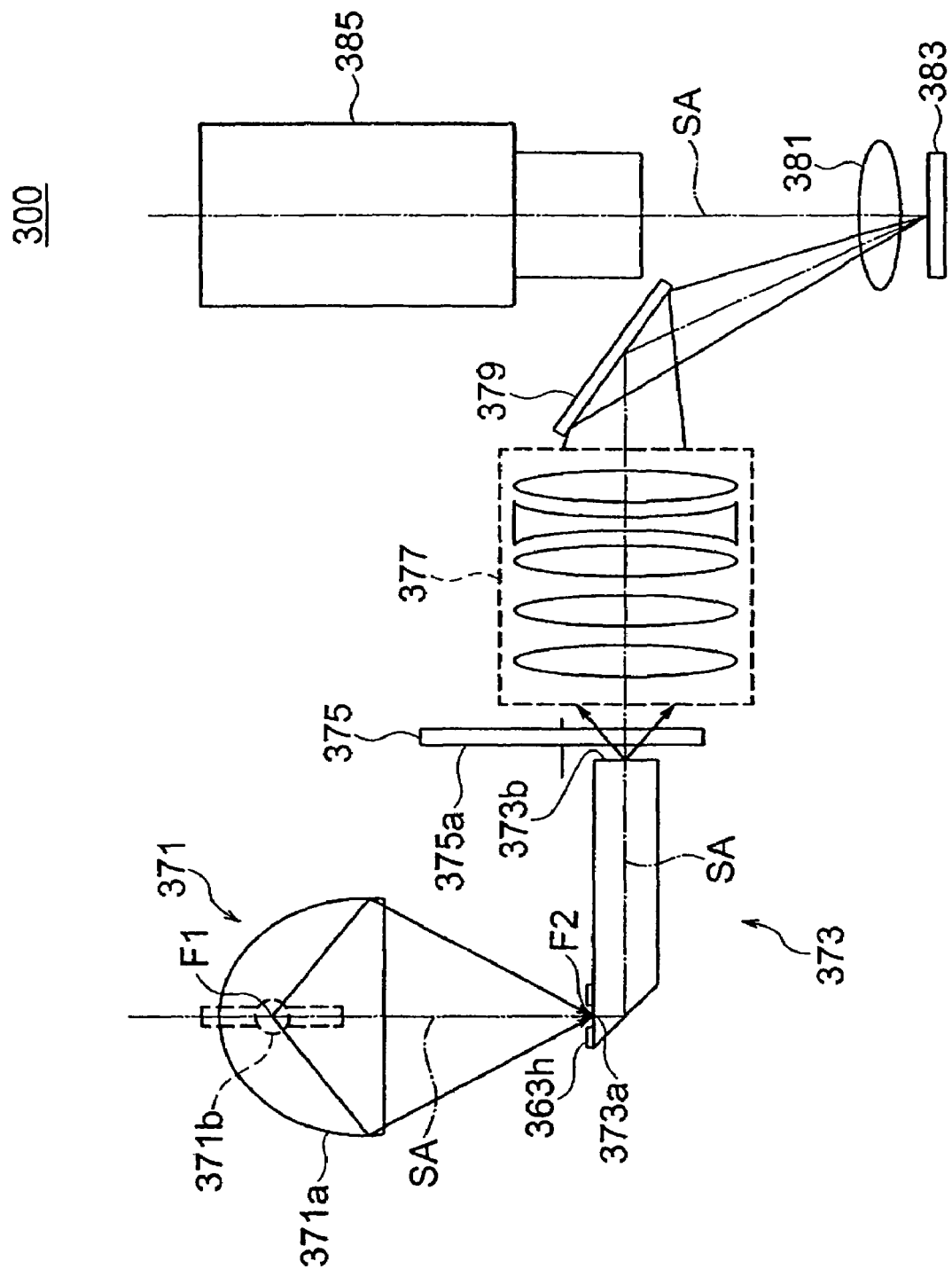
FIG. 11 is an explanatory figure for explanation of the essential portions of a projection type display apparatus according to a sixth embodiment of the present invention.

FIG. 11 is an explanatory figure for explanation of the overall construction of this projection type display apparatus according to the sixth preferred embodiment of the present invention.

This projector 300 comprises, arranged in the specified order along the system optical axis SA, a light source 371, an integrator 373 for SCR, a color wheel 375 for SCR, a relay optical system 377, a reflective mirror 379, a field lens 381, a digital mirror device (DMD) 383, and a projection lens 385.

The light source 371 comprises an elliptical reflector 371a which includes an inner surface whose reflective surface is an ellipsoid of revolution, and a light source lamp 371b which is a metal halide lamp or a high pressure mercury lamp or the like. This light source lamp 371b is arranged at a first focal point F1 of the elliptical reflector 371a, and the light which is emitted from the light source 371 is focused upon the second focal point of the elliptical reflector 371a, and is conducted into the interior of the integrator 373 which possesses a light incidence aperture 373a which is disposed so as to coincide with this second focal point F2. The light source light from the light incidence aperture 373a which is thus incident into the integrator 373 is subjected to wave front splitting by repeated reflection in its interior, and is then emitted from its emission port 373b as illumination light which has been made uniform by superimposition. This illumination light which has been emitted from the integrator 373 is incident upon the color wheel 375. The color wheel 375 is capable of being rotated by a motor which is not shown in the figures, and it comprises a filter surface 375a which is arranged so as to confront the emission port 373b of the integrator 373, and upon which three linear filters of the three primary colors green (G), blue (B), and red (R) are formed as spirals. This filter surface separates the illumination light which has been emitted by the integrator 373 into its three primary colors in time sequence, and emits the resultant light. At this time, apart from the colored light which passes through the filter surface 375a, also some light is reflected by the filter surface 375a and is returned to the integrator 373. This light for reuse which is returned to the integrator 373 arrives at the other end of the reflector 373 while being reflected within it, and is then reflected by a mirror 363h which is arranged around the light incidence aperture 373a and returns back to within the integrator 373, so as to return back to illuminate the filter surface 375a again. This type of technique for reusing light from the light source is termed a "SCR technique". The relay optical system 377 creates an image of the light from the emission port 373b of the integrator 373 which has passed through the color wheel 375 upon the DMD 383, and thereby arrives at a uniform illumination of the DMD 383. The DMD 383 is a spatial light modulation device of a reflection direction control type which is endowed with the function of emitting picture element light which corresponds to each picture element in the direction of the projection lens 385, so as thereby to display each of the picture elements according to the picture element signal, by reflection from a micro mirror which is supplied with the illumination light which is incident thereupon. The picture element light which is emitted from this DMD 383 is projected upon a screen (not shown in the figures) via the field lens 381 and the projection lens 385.

Figure 12A:
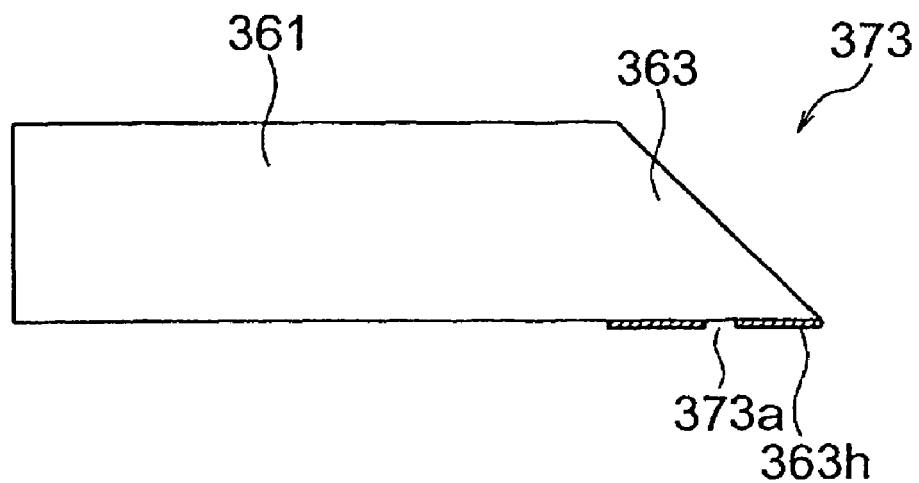
FIGS. 12A and 12B are respectively a plan view and a side view showing an integrator.
Figure 12B:
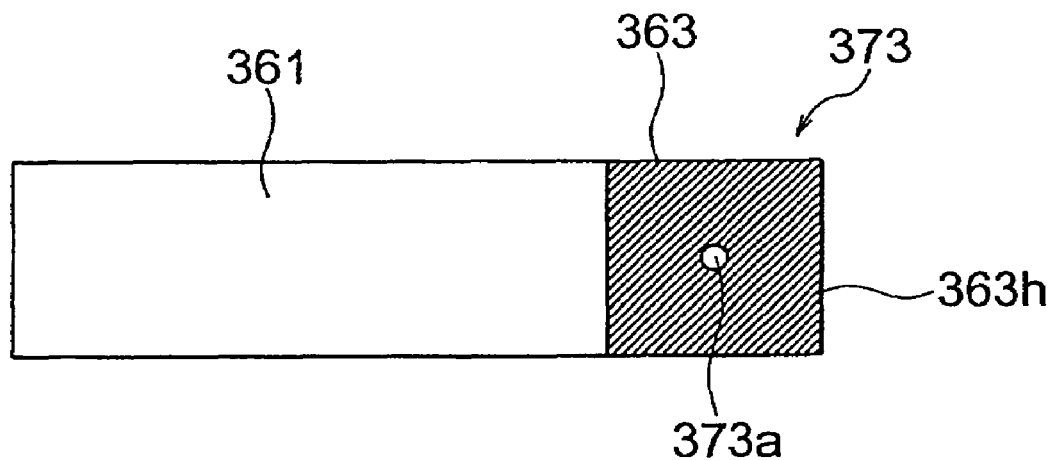

FIG. 12A is a plan view of the integrator 373 of FIG. 11, and FIG. 12B is a side view of that integrator 373.

This integrator 373 has an external appearance which is almost the same as that of the integrator optical system 121c of the third preferred embodiment of the present invention as shown in FIG. 6. In other words, this integrator 373 comprises a four cornered rod shaped rod integrator main body 361, and a right angled prism portion 363 which is provided at one end thereof. At the incidence side of the right angled prism portion 363 there is formed a reflective layer 363h which is made from a dielectric material or aluminum or the like, and a light incidence aperture 373a is formed at the central portion of this reflective layer 363h for admitting light from the light source 371. This light source light which is incident upon the right angled prism portion 363 via the light incidence aperture 373a is totally internally reflected by the inclined end surface 363a, and its optical path is bent around and folded, so that it proceeds along within the rod integrator main body 361 and then is emitted from an emission port 373a. On the other hand, although the light from the light source which is reflected by the color wheel 375 and is incident upon the emission port 373a passes backwards along through the rod integrator main body 361 and is incident upon the right angled prism portion 363, in this case, after having been totally internally reflected by the inclined end surface 363a, it is reflected by the reflective film layer 363h, and thus returns within the rod integrator main body 361. Thus, in this sixth preferred embodiment of the present invention as well, simply by adjusting the coefficient of refraction of the right angled prism portion 363, and without providing any reflective layer upon its inclined end surface 363a, it is possible to direct the light from the light source which is incident from the light incidence aperture 373a along the rod integrator main body 361 which is orthogonal thereto by 100% reflection from the right angled prism portion 363.

Seventh Embodiment

In the following, a projection type display apparatus (a projector) according to the seventh preferred embodiment of the present invention will be described. This projector according to the seventh preferred embodiment of the present invention is a variant of the projector of the third preferred embodiment described above.

Figure 13A:
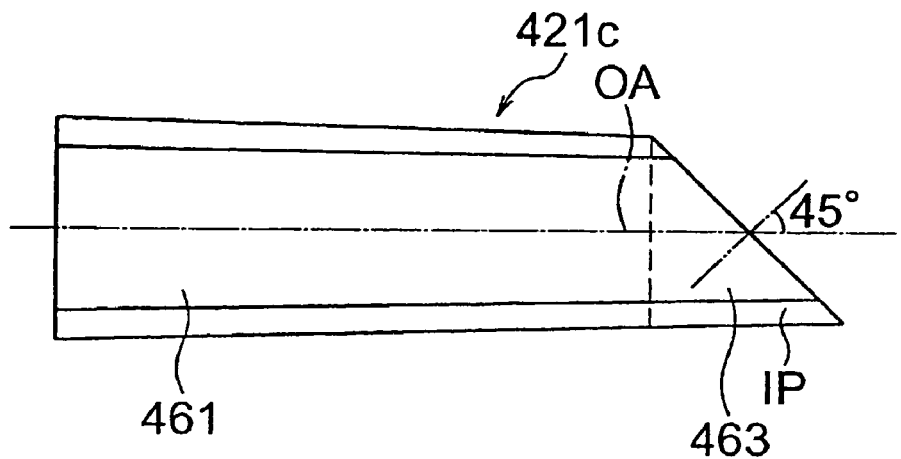
FIGS. 13A to 13C are explanatory figures for explanation of the essential portions of a projection type display apparatus according to a seventh embodiment of the present invention.
Figure 13B:
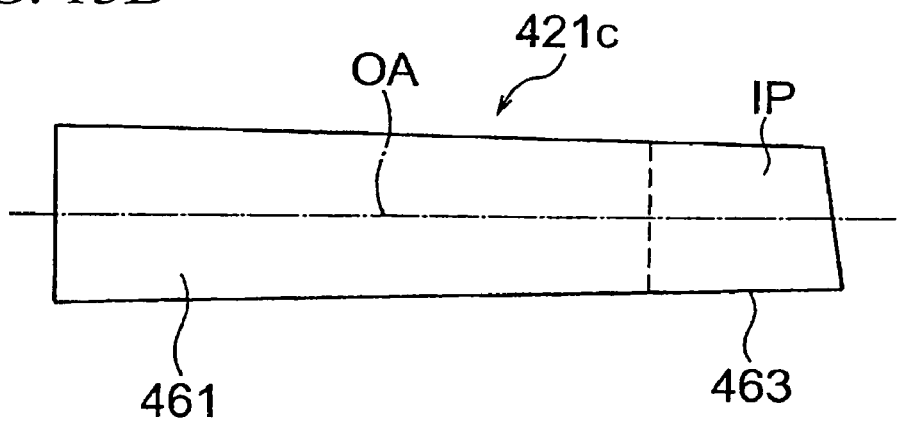
Figure 13C:
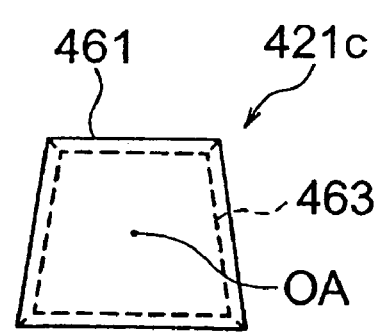

FIGS. 13A to 13C are respectively a plan view, a side view, and an elevation view for explanation of an integrator optical system, which is an essential portion of this projector according to the seventh preferred embodiment of the present invention. This integrator optical system 421c is a post shaped member which has been made by processing glass, just like the integrator optical system 121c according to the third preferred embodiment of the present invention which was shown in FIGS. 7A and 7B above. However, the aspects in which this seventh preferred embodiment of the present invention differs from the third preferred embodiment described above, are that the cross sectional shape orthogonal to the optical axis OA is trapezoidal, and that, at the end of its tapered shape where it becomes narrower towards its end, it has an inclined end surface 463 which is inclined at an angle of 45° with respect to the optical axis OA. The light from the light source which is incident upon the incident port IP of this integrator optical system 421c is directly incident upon the inclined end surface 163a which is opposed thereto, or is incident upon this inclined end surface 163a after having been reflected by the end surface portions of the right angled prism portion 463, or the like. The light from the light source which is incident upon the inclined end surface 163a is totally internally reflected by this inclined end surface 163a without any loss, and its optical path is folded and bent, so that it is conducted to the rod integrator main body 461. In this case as well, not only the rod integrator main body 461 functions as an integrator, but also the right angled prism portion 463.

While preferred embodiments of the invention have been described and illustrated above, it should be understood that these are exemplary of the invention and are not to be considered as limiting. For example, with the integrator optical system 121c of FIGS. 7A and 7B, it would be possible to connect to the incident port IP a rod integrator which had a rectangular cross sectional shape of the same dimensions as the opening of the incident port IP, or greater.

What is claimed is:

1. A light conducting unit disposed between a light source and a region which is to be illuminated, comprising:
    a polygonal prism made from a first medium with a first coefficient of refraction;
    a first light conducting unit which directs light to be incident upon a first surface of the polygonal prism; and
    a second light conducting unit upon which light emitted from a second surface of the polygonal prism is incident, wherein;
    the polygonal prism comprises a reflective device which reflects light that is incident into the polygonal prism from the first surface towards the second surface;
    a second medium with a second coefficient of refraction which is less than the first coefficient of refraction is provided at the first surface and the second surface;
    interiors of the first light conducting unit and the second light conducting unit are filled with the second medium; and
    the first light conducting unit and the second light conducting unit are provided directly adjacent to the polygonal prism.

2. A light conducting unit according to claim 1, wherein the polygonal prism is a triangular prism.

3. A light conducting unit according to claim 1,
    wherein the first light conducting unit and the second light conducting unit are made in a tubular shape from at least one reflective body with a light reflective surface facing inwards.

4. A light conducting unit according to claim 3, wherein a reflection prevention device which suppresses the reflection of light is provided upon at least one of the first surface, the second surface, and the incidence surfaces and the emission surfaces of the first light conducting unit and of the second light conducting unit.

5. A light conducting unit according to claim 4, wherein the reflection prevention device is a reflection prevention layer.

6. A light conducting unit according to claim 1,
    wherein the first light conducting unit and the second light conducting unit are made in the shape of posts from a third medium with a third coefficient of refraction,
    the third coefficient of refraction is greater than a coefficient of refraction of a medium which surrounds the first light conducting unit and the second light conducting unit, and
    the second medium is disposed between the first light conducting unit and the first surface, and between the second light conducting unit and the second surface.

7. An illumination apparatus comprising:
    a light source; and
    a light conducting unit according to claim 1, located between the light source and a region which is to be illuminated.

8. A projection type display apparatus comprising:
    an illumination apparatus according to claim 7;
    a light modulation device which modulates the light which has been emitted from the illumination apparatus; and
    a projection device which projects the light which has been modulated by the light modulation device.

9. A light conducting unit disposed between a light source and a region which is to be illuminated, comprising:
    a polygonal prism made from a first medium with a first coefficient of refraction;
    a first light conducting unit which directs light to be incident upon a first surface of the polygonal prism; and
    a second light conducting unit upon which light emitted from a second surface of the polygonal prism is incident, wherein;
    the polygonal prism comprises a reflective device which reflects light that is incident into the polygonal prism from the first surface towards the second surface;
    a second medium with a second coefficient of refraction which is less than the first coefficient of refraction is provided at the first surface and the second surface;
    the first light conducting unit and the second light conducting unit are made in a shape of posts from a third medium with a third coefficient of refraction;
    the third coefficient of refraction is greater than a coefficient of refraction of a medium which surrounds the first light conducting unit and the second light conducting unit;
    the second medium is disposed between the first light conducting unit and the first surface, and between the second light conducting unit and the second surface, and
    gaps between the first light conducting unit and the first surface, and between the second light conducting unit and the second surface, are greater than a product of a wavelength of the light which is being propagated through the first and second light conducting units, and the second coefficient of refraction.

10. A light conducting unit disposed between a light source and a region which is to be illuminated, comprising:
    a polygonal prism made from a first medium with a first coefficient of refraction;
    a first light conducting unit which directs light to be incident upon a first surface of the polygonal prism; and
    a second light conducting unit upon which the light emitted from a second surface of the polygonal prism is incident, wherein;
    the polygonal prism comprises a reflective device which reflects light that is incident into the polygonal prism from the first surface towards the second surface;
    a second medium with a second coefficient of refraction which is less than the first coefficient of refraction is provided at the first surface and the second surface;
    the first light conducting unit and the second light conducting unit are made in the shape of posts from a third medium with a third coefficient of refraction;
    the third coefficient of refraction is greater than a coefficient of refraction of a medium which surrounds the first light conducting unit and the second light conducting unit;
    the second medium is disposed between the first light conducting unit and the first surface, and between the second light conducting unit and the second surface;
    a first convex portion is provided at approximately a central portion of a surface of the first light conducting unit which opposes the first surface;
    a second convex portion is provided at approximately a central portion of a surface of the second light conducting unit which opposes the second surface; and
    the first convex portion and the first surface are in mutual contact, and the second convex portion and the second surface are in mutual contact.

* * * * *